(12) United States Patent
Atwood

(10) Patent No.: US 8,179,234 B1
(45) Date of Patent: May 15, 2012

(54) SOUND GENERATION APPARATUS AND METHOD FOR AN ELECTRIC VEHICLE

(75) Inventor: Dennis Atwood, Fairfax, CA (US)

(73) Assignee: Atwood Bell, LLC, Fairfax, CA (US)

( * ) Notice: Subject to any disclaimer, the term of this patent is extended or adjusted under 35 U.S.C. 154(b) by 397 days.

(21) Appl. No.: 12/655,203

(22) Filed: Dec. 23, 2009

Related U.S. Application Data

(60) Provisional application No. 61/203,473, filed on Dec. 23, 2008.

(51) Int. Cl.
*G08B 3/10* (2006.01)

(52) U.S. Cl. ............ 340/384.3; 340/692; 340/441; 340/384.1; 446/397; 381/86

(58) Field of Classification Search .... 340/384.1–384.5, 340/463–467, 474, 692; 446/397, 409; 381/57, 381/61, 86
See application file for complete search history.

(56) References Cited

U.S. PATENT DOCUMENTS

| | | | |
|---|---|---|---|
| 5,313,191 A | | 5/1994 | Yamashita et al. |
| 5,517,173 A | * | 5/1996 | Cha et al. ............... 340/404.1 |
| 5,635,903 A | | 6/1997 | Koike et al. |
| 6,559,758 B2 | | 5/2003 | Rey |
| 6,696,931 B2 | | 2/2004 | Paranjpe |
| 6,725,150 B1 | * | 4/2004 | Glandian ............... 701/115 |
| 6,859,539 B1 | * | 2/2005 | Maeda .................... 381/86 |
| 6,959,094 B1 | * | 10/2005 | Cascone et al. ........... 381/86 |
| 7,188,005 B2 | | 3/2007 | Toba et al. |
| 7,203,321 B1 | * | 4/2007 | Freymann et al. ......... 381/61 |
| 7,253,746 B2 | * | 8/2007 | Maekawa et al. ......... 340/903 |
| 7,764,800 B2 | * | 7/2010 | Maeda .................... 381/86 |
| 7,979,147 B1 | * | 7/2011 | Dunn ..................... 700/94 |
| 8,018,328 B2 | * | 9/2011 | Goldstein et al. ......... 340/384.1 |
| 2005/0175186 A1 | * | 8/2005 | Yasushi et al. ........... 381/61 |

* cited by examiner

*Primary Examiner* — Daniel Wu
*Assistant Examiner* — Nay Tun
(74) *Attorney, Agent, or Firm* — Jay P. Hendrickson

(57) ABSTRACT

A sound generation apparatus for an electric vehicle that is being operated by a driver comprising: a sound generation circuit attached to a wheel of the electric vehicle; Faraday generators for supplying pulses of electrical current within the circuit while the wheels of the vehicle are rotating; a battery for supplying battery power within the circuit; a pulse activated power controller that is activated upon the receipt of an initial pulse form one of the Faraday generators and controls the supply of battery power within the circuit; and a programmed microcontroller that uses the battery power to simulate a motor sound for the electric vehicle and uses additional pulses from the Faraday generators to determine whether the vehicle is accelerating, decelerating or moving in reverse and, based upon its state of motion, modifies the simulated motor sound.

7 Claims, 20 Drawing Sheets

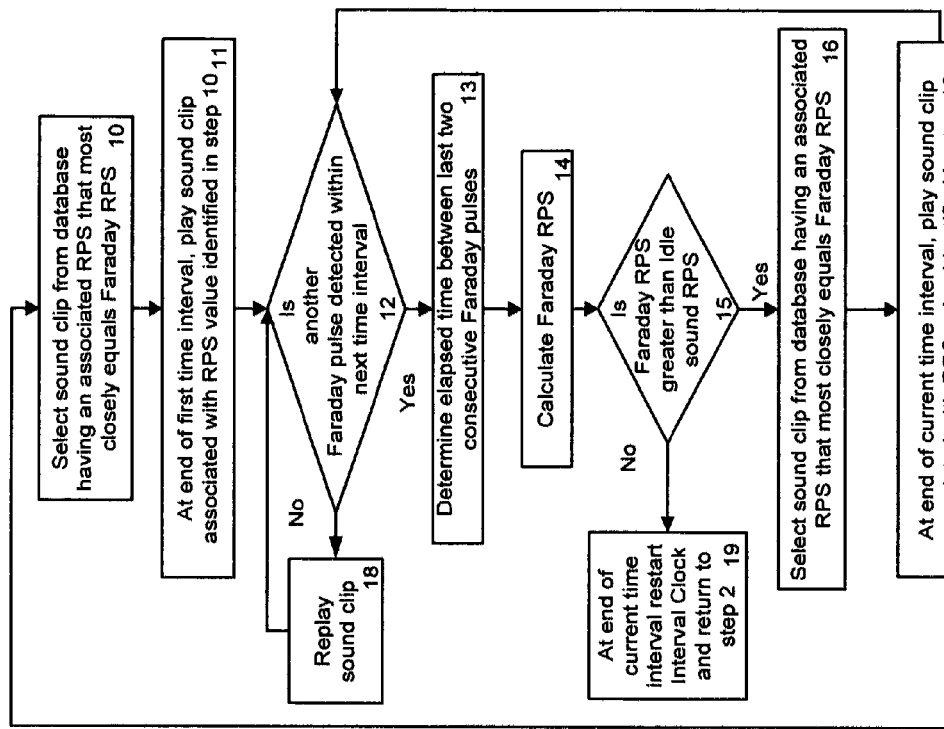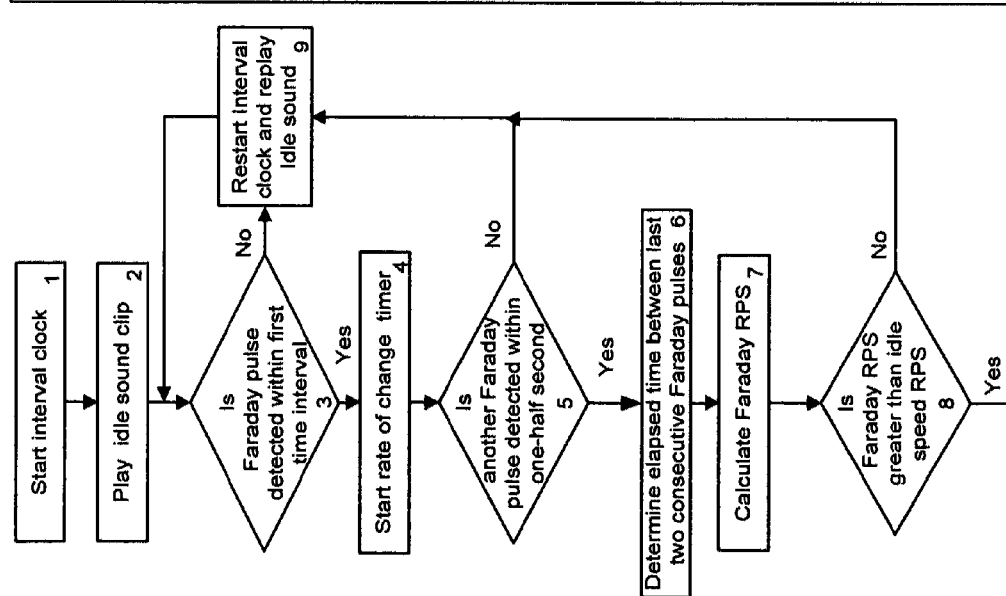
FIG. 5A

40

Forward Vehicle Direction

| Angular Velocity of Wheel Calculated from Engine Speed (RPS) | Digital Motor Sound Recordings |
|---|---|
| Idle Speed | Idle Sound Clip |
| RPS-1 | Sound Clip-1 |
| RPS-2 | Sound Clip-2 |
| RPS-3 | Sound Clip-3 |
| . | . |
| . | . |
| . | . |
| Rps-10 | Sound Clip-10 |

Reverse Vehicle Direction

| Angular Velocity of Wheel Calculated from Engine Speed (RPS) | Digital Motor Sound Recordings |
|---|---|
| Idle Speed | Reverse Sound Clip-1 |
| Idle Speed | Reverse Sound Clip-2 |
| Idle Speed | Reverse Sound Clip-3 |

FIG. 5B

SOUND GENERATION APPARATUS AND METHOD FOR AN ELECTRIC VEHICLE

RELATED APPLICATION

This application relates to and claims the benefit under 35 U.S.C. §119(e) of U.S. Provisional Application No. 61/203,473, filed Dec. 23, 2008.

TECHNICAL FIELD

This application relates to electromechanical devices for the production of sound for electric vehicles.

BACKGROUND OF THE INVENTION

Electric and hybrid vehicles that are powered, at least in part, by electricity are becoming increasing popular due to the demand for vehicles that emit reduced levels carbon dioxide as compared to vehicles that are powered solely by fossil fuels. This demand is being created by the nearly uniform consensus among the scientific community that carbon dioxide emissions are contributing to, if not being the sole cause of, global warming that is threatening the very existence of life on the planet.

The increase in the number of electric vehicles, however, is creating an unintended consequence that is threatening the safety of pedestrians. Due to the fact that an electric vehicle produces a nearly imperceptible engine sound, pedestrians are not able not hear the vehicles that are approaching them. This unsafe condition is made worse when the pedestrian is blind or vision impaired. Other persons who are at risk would include bicyclists, runners, and small children. In fact, an increasing number of hybrid car accidents involving pedestrians are being reported throughout the United States. In response to these safety concerns and accidents, several governments have begun to consider enacting legislation to address these issues. Representatives to the Congress of the United States have introduced "The Pedestrian Safety Enhancement Act of 2008" that is intended to protect the blind and other pedestrians from injury or death as a result of the operation of a silent vehicle. The Act requires the Secretary of Transportation to conduct a study to determine how to protect the blind and others from being injured or killed by vehicles using hybrid, electric, or other silent engine technologies. Similarly, in California, a bill has also been proposed to study these safety concerns.

Accordingly, the present invention is intended to decrease the threat that silent vehicle engines pose to pedestrians and other persons.

SUMMARY

The sound generation apparatus for an electric vehicle that is being operated by a driver comprises: a sound generation circuit that is attached to a wheel of the electric vehicle; at least two radially positioned Faraday generators within the circuit for supplying pulses of electrical current to the circuit while the wheels of the vehicle are rotating; at least one battery within the circuit for supplying battery power to the circuit; a pulse activated power controller within the circuit that is activated upon the receipt of an initial pulse form one of the at least two Faraday generators, said power controller for controlling the supply of battery power to the circuit; and a programmed microcontroller within the circuit for generating a motor sound for the electric vehicle while being operated by the driver, said microcontroller also having at least two microcontroller ports for receiving additional pulses produced by the at least two Faraday generators for determining whether the vehicle is accelerating, decelerating or moving in reverse and based upon its state of motion modifying the motor sound.

In another embodiment, the sound generation apparatus for an electric comprises: a sound generation circuit that is attached to a wheel of the electric vehicle; at least two radially positioned Faraday generators within the circuit for supplying pulses of electrical current to the circuit while the wheels of the vehicle are rotating; at least one battery within the circuit for supplying battery power to the circuit; a pulse activated power controller within the circuit that is activated upon the receipt of an initial pulse form one of the at least two Faraday generators, said power controller for controlling the supply of battery power to the circuit; a gyroscope within the circuit for generating voltage values based upon the angular velocity of the wheel of the vehicle; and a programmed microcontroller within the circuit having a sound recordings database containing a plurality of sound recording clips of the sounds of a combustion engine operating at various engine speeds for use by the microcontroller in the generation of an actual motor sound for the electric vehicle; said microcontroller using the voltage values generated by the gyroscope to periodically calculate the angular velocity of the wheel, selecting an angular velocity based upon engine speed from the database that most closely matches the angular velocity of the wheel, and playing the sound clip that is associated with the engine speed.

Also described is a method of generating a sound for an electric vehicle that is being operated by a driver, comprising: generating an initial pulse of electrical current from one of at least two rotating Faraday generators within a sound generation circuit attached to the wheel of the vehicle; activating a pulse activated power controller within the circuit using the initial pulse of electrical current; supplying battery power through the power controller to a microcontroller within the circuit; generating a simulated motor sound from the battery power supplied to the microcontroller; sending additional pulses of electrical current from the at least two rotating Faraday generators to at least two microcontroller ports; and processing the additional pulses to determine whether the vehicle is accelerating, decelerating or moving in reverse and based upon its state of motion modifying the simulated motor sound.

BRIEF DESCRIPTION OF THE DRAWINGS

FIG. 5A is a flow chart illustrating an operation of the programmed microcontroller that is part of the circuit illustrated in FIG. 5 and related to the production of the actual motor sound.

FIG. 5B is an illustration of a database within the memory of the microcontroller that is used to store actual sounds of a combustion engine.

DETAILED DESCRIPTION OF THE INVENTION

Figure 1:
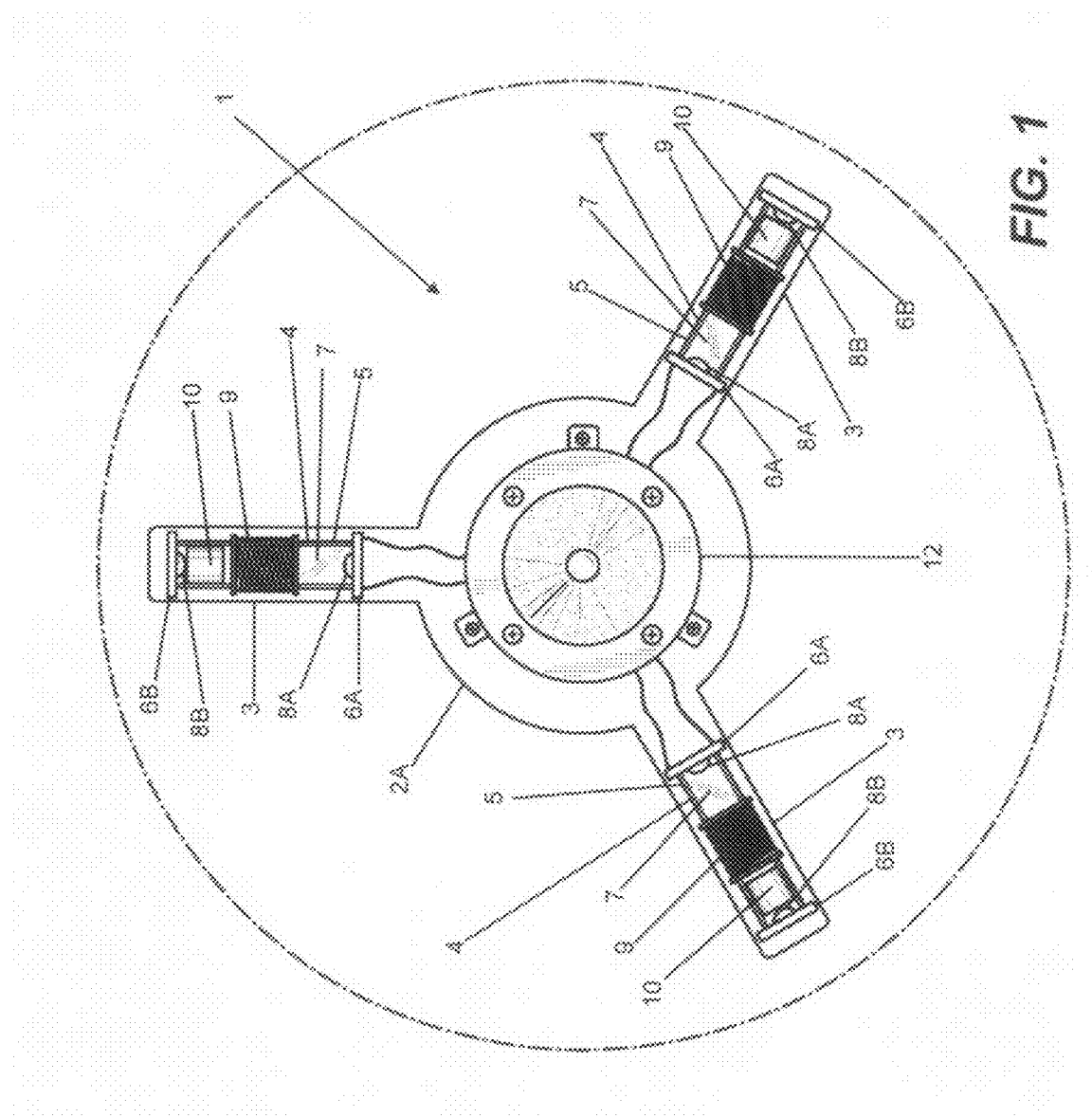
FIG. 1 is a side plan view of the sound generation apparatus, having three faraday generators, with the apparatus shown as it would appear when attached to the wheel of a vehicle.
Figure 2:
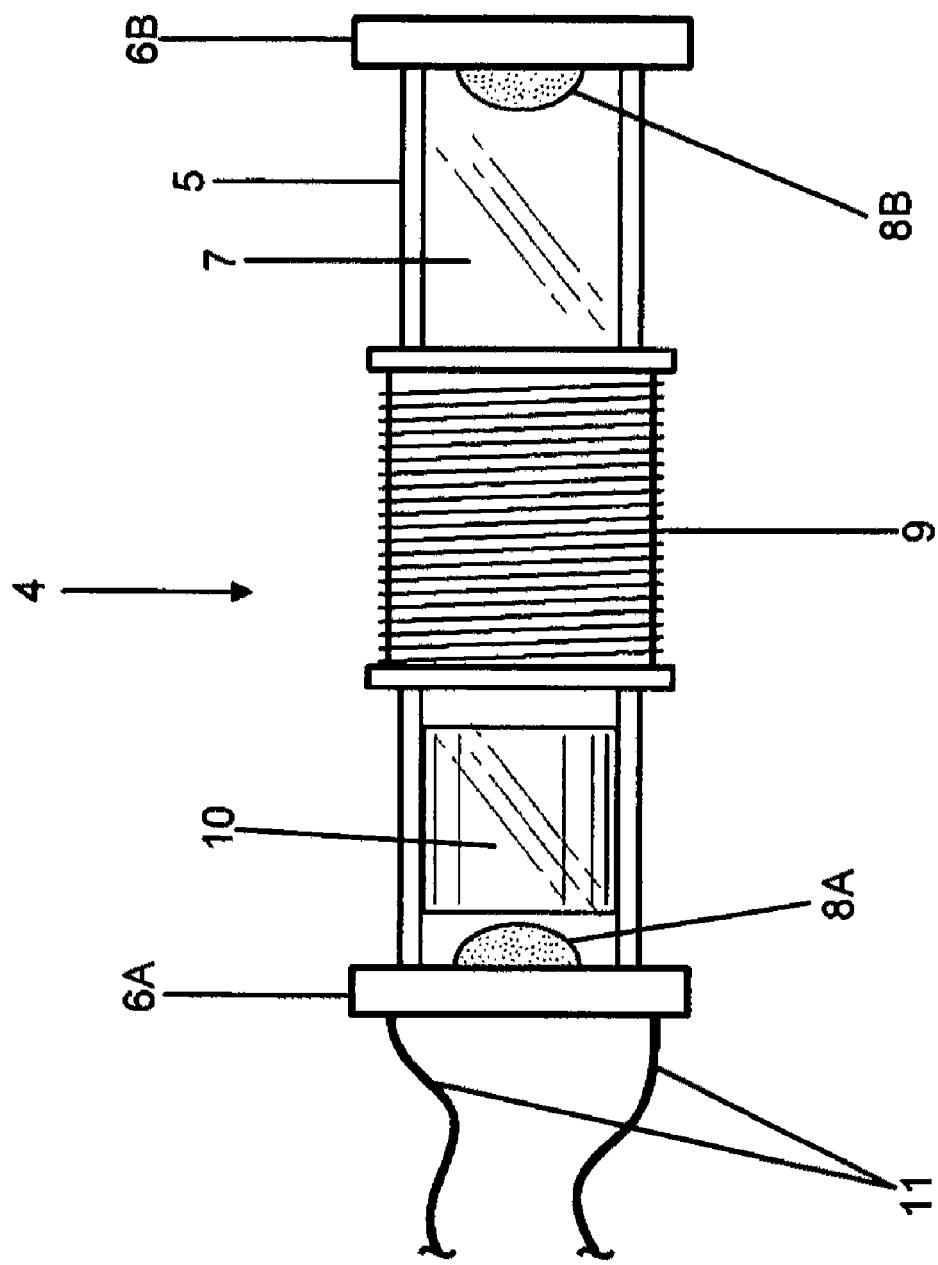
FIG. 2 is a partial side plan view of one of the three faraday generators.

Referring to FIG. 1, one embodiment of a sound generation apparatus 1 for use with an electric vehicle that is being operated by a driver comprises a circularly shaped mounting plate 2A having three radially extending arms 3, with the arms approximately 120° apart. A faraday generator 4 is attached to the each of the arms 3. As more specifically illustrated in FIG. 2, each of the three faraday generators 4 comprises an elongate, tubular shaped housing 5, having an inner end plate 6A attached to one end of housing 5, and an outer end plate 6B attached to the other end of housing 5, so as to create a tubular channel 7 within housing 5. Inner and outer resilient bumpers 8A and 8B are disposed within tubular channel 7, with inner bumper 8A attached to the inside surface of the inner end plate and outer bumper 8B attached to the inside surface of the outer end plate. A copper coil 9 is disposed around the outside surface of housing 5 and positioned near the midpoint of elongate housing 5. Integral with coil 9 is a pair of electronically conductive leads 11 that extend from the coil along the outside surface of housing 5, with an end of each lead being attached to an electronic circuit 20 that is integral with a circuit board 2B. Electronic sound generation circuit 20 will be described in more detail in connection with FIGS. 3 and 4. A solid magnetic cylinder 10 is disposed within channel 7, with cylinder 10 having a diameter that is less than the inside diameter of channel 7, so as to permit magnetic cylinder 10 to slide longitudinally within channel 7 and between pair of bumpers 8A and 8B. An acoustical speaker 12 is attached to the center of mounting plate 2A, and speaker 12 is in electrical connection with sound generation circuit 20, which is disposed behind speaker 12.

Sound generation apparatus 1 can be attached to the outside surface of a vehicle wheel 15 (shown as a dashed line in FIG. 1), with mounting plate 2A attached to the center or hub of wheel 15. In this regard, apparatus 1 can be attached to wheel 15 as an after-market device that contains sufficient attaching mechanisms connected to mounting plate 2A in order to attach apparatus 1 to wheel 15. Alternatively, apparatus 1 can be integrated into wheel 15 by radially attaching each of the faraday generators 4 to the spokes of the wheel, with the three generators spaced approximately 120° degress apart. Similarly, mounting plate 2A can be integrated into the wheel, preferably positioned at the hub of the wheel, with each pair of conductive lead wires 11 extending radially from mounting board 2A to a respective faraday generator 4. The only material constraints to mounting plate 2A and wheel 15 are that they both be made from non-ferrous materials so as not to interfere with the magnetic field and the production of electricity by faraday generators 4. Other methods of attaching apparatus 1 to the wheel of a vehicle will be readily apparent to those skilled in the art.

Before describing the operation of the sound generation apparatus 1 in detail, a brief description will illustrate the generation of electronic pulses from each of the three faraday generators 4. As noted, in one embodiment, sound generation apparatus 1 can be attached to a wheel of an electric vehicle as an after-market device, or in another embodiment, apparatus 1 can integrated into the wheel by the vehicle or wheel manufacturer. When a stopped electric vehicle first starts to move in a forward direction, apparatus 1 will simultaneously start to rotate around the axis of the wheel. At the same time, each of the three Faraday generators 4 will start to rotate about the same axis. As one of the Faraday generators 4 starts to approach a vertical alignment, the force of gravity will cause the generator's solid magnetic cylinder 10 to start to slide down tubular channel 7 within housing 5 and will ultimately pass through coil 9, until the downward motion of cylinder 10 is arrested by a resilient bumper, either bumper 8A or 8B depending upon whether the vertically aligned Faraday generator is above or below the axis of rotation. The motion of magnetic cylinder 10 through coil 9 produces a voltage across the coil, causing a pulse of alternating electrical current to flow through conducting leads 11 that are electrically connected to sound generation circuit 20. As the wheel continues to rotate, a second Faraday generator 4 will start to approach a vertical alignment and the force of gravity will similarly cause the generator's solid magnetic cylinder 10 to start to slide down tubular channel 7 within housing 5 and will also pass through coil 9, until its downward motion is also arrested by a resilient bumper 8A at the end of housing 5. Again, the motion of magnetic cylinder 10 through coil 9 produces another voltage across the coil, causing another pulse of alternating electrical current to flow through conducting leads 11 that are electrically connected to circuit 20. In the same manner, a third Faraday generator 4 will produce another pulse of alternating current within conducting leads 11.

As will be described in more detail below, as the electric vehicle continues to move in a forward direction these consecutive pulses are used with sound generation circuit 20 to ultimately generate a sound that can warn a pedestrian that an electric vehicle is moving in their vicinity. As the electric vehicle continues to move, the sound will continue to be generated until the speed of the vehicle increases to the point where the centrifugal forces acting on each of the magnetic cylinders 10 overcomes the force of gravity. At this point, each of the magnetic cylinders 10 will remain in contact with its respective outer resilient bumper 8B, no longer passing through coil 9, and the production of pulses will stop, ultimately causing the generation of sound to stop.

Figure 3:
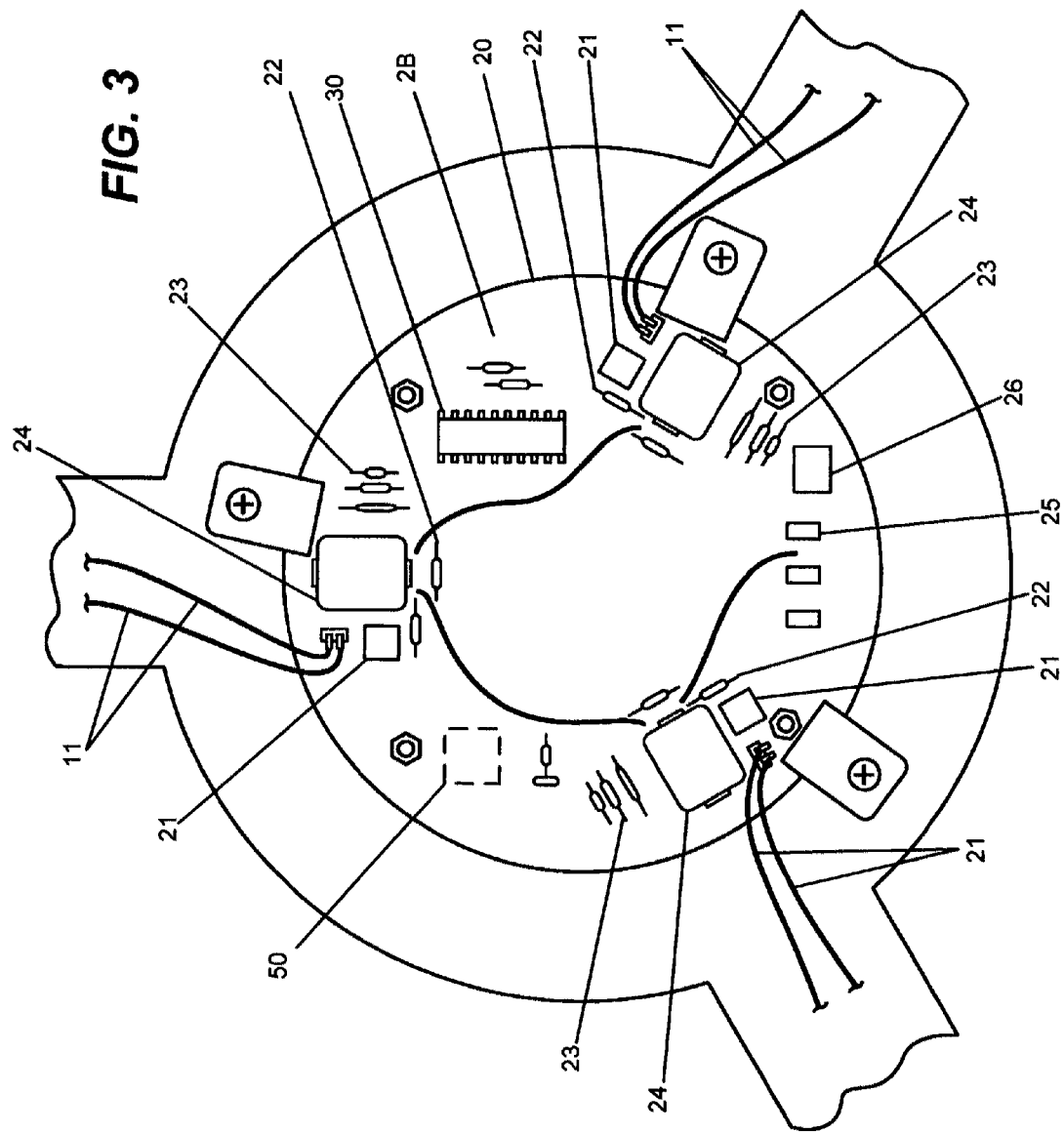
FIG. 3 is a partial side plan view of the sound generation apparatus, with the acoustical speaker removed in order to illustrate the electronic components that operate in conjunction with the three faraday generators to produce sound.
Figure 4:
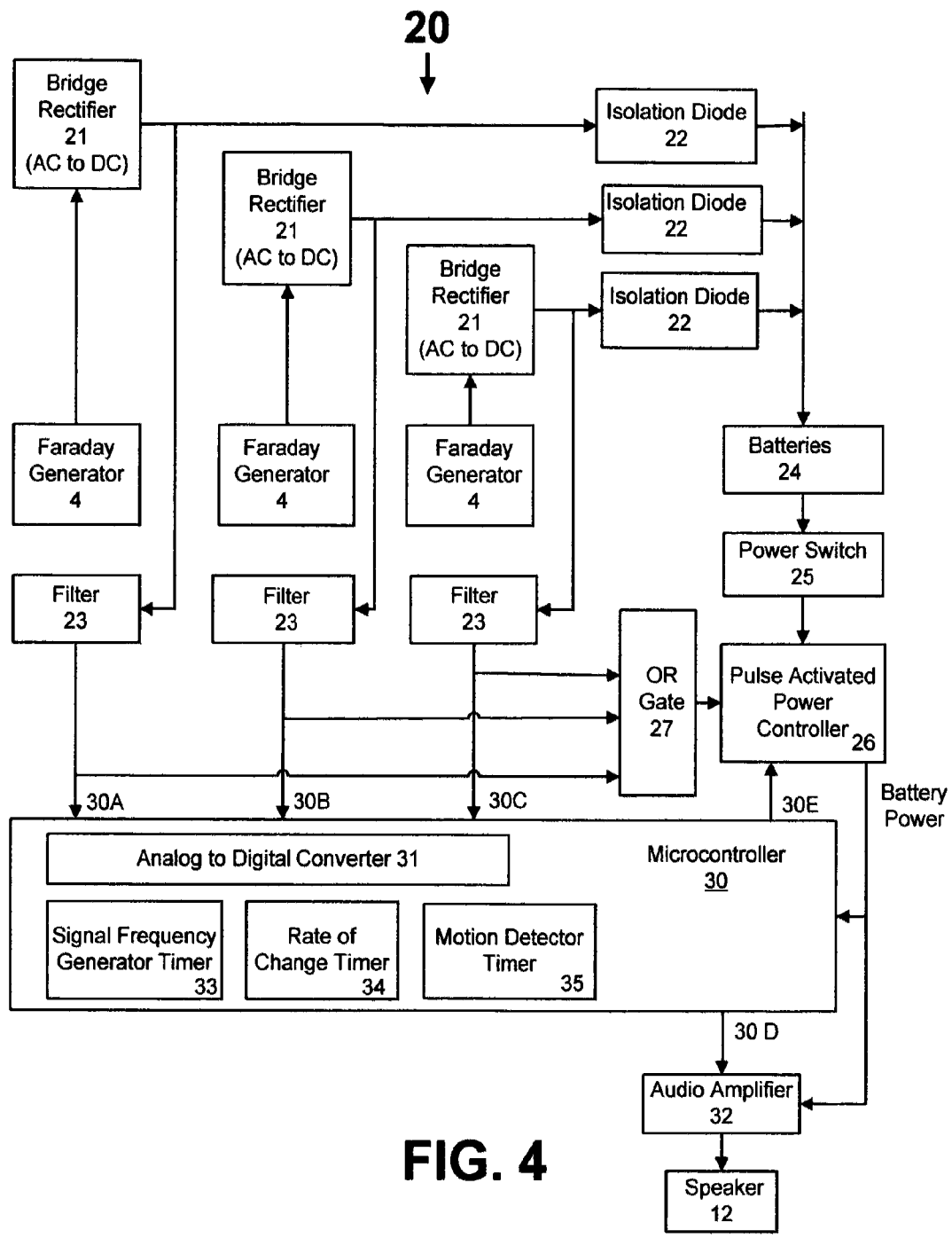
FIG. 4 is a schematic diagram of the electric components and circuitry that is used to generate a simulated motor sound for an electric vehicle.
Figure 4A:
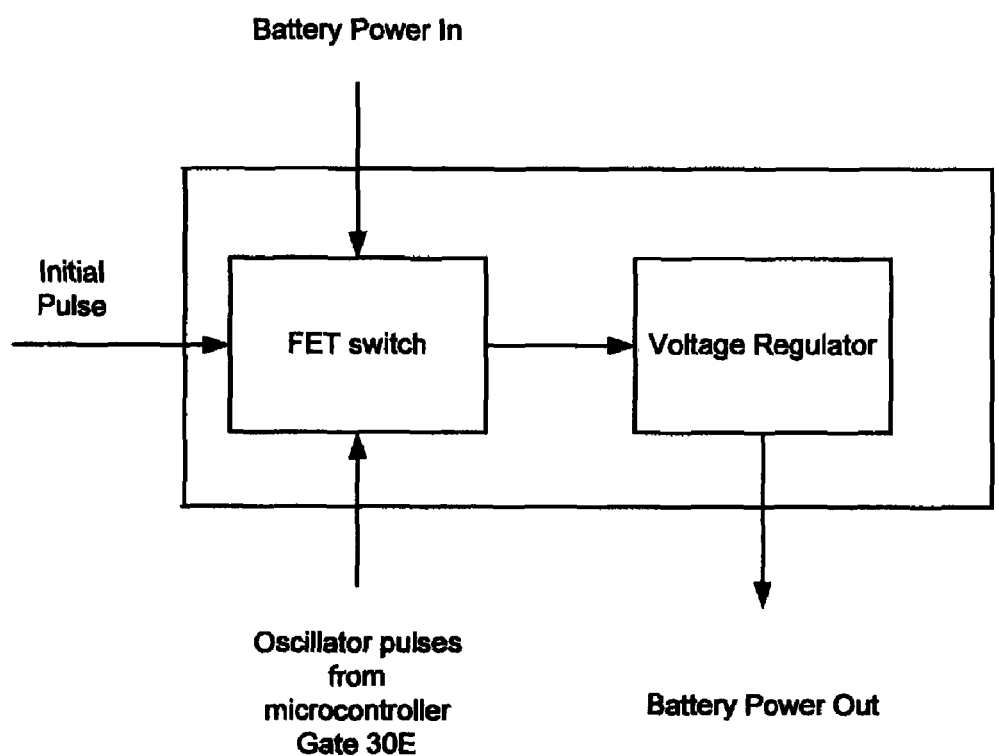
FIG. 4A is a schematic illustration of an power control circuit used to control the application of battery power to the programmed microcontroller that is part of the circuit illustrated in FIG. 4.

Turning now to FIGS. 3 and 4, electronic circuit 20, which is attached to circuit board 2B, which is in turn attached to mounting plate 2A, is used to process the pulses that are produced by each of the three Faraday generators 4. Each of the three Faraday generators 4 is connected to the electronic circuit 20 by electrically connecting each pair of the conductive leads 11 to a separate bridge rectifier 21, which converts the alternating current pulses produced by each of the generators 4 to direct current pulses. Each bridge rectifier 21 is, in turn, electrically connected to a separate isolation diode 22 and to a separate filter 23. Each isolation diode 22, which is electrically connected to a battery 24 (only one of the three batteries is shown in FIG. 4), allows the direct current pulses to recharge the battery and prevents current from flowing back from the battery and changing the voltage level of the pulses. Preferably, each battery 24 is a 3.6 volt 60 MAH (Milli-Ampere Hour) Nickel Metal Hydride (Ni-MH) or Lithium Ion (Li-ion) rechargeable battery connected in parallel. Each battery 24 is electrically connected to a manually operated power switch 25, which is provided in order to prevent the circuit from becoming active during shipping and running down the batteries and is activated when sound generation apparatus 1 is installed. Power switch 25 is, in turn, electronically connected to a pulse activated power controller 26, which is activated by an initial pulse from one of the Faraday generators. Once activated, the power control circuit connects microcontroller 30 to battery power supplied from batteries 24, and at the same time provides battery power to audio amplifier 32. A more detailed description of power controller 26 is illustrated in FIG. 4A. The initial Faraday pulse temporarily activates an FET switch, which allows battery power to be supplied to a voltage regulator, which in turn prevents unwanted battery power spikes from being supplied to microcontroller 30 and to audio amplifier 32. The FET switch will remain on and continue to supply battery power to the microcontroller so long as pulses from the microcontroller's oscillator are sent from microcontroller gate 30E to the FET switch. A preferred microcontroller can be a 28-pin flash-based, 8 bit CMOS microcontroller (Model No. PIC 18F46K20) manufactured by Microchip Technology, Inc.

As mentioned above, each bridge rectifier 21 is also connected to a separate filter 23. Each filter 23 comprises: a series resistor that is used to limit the magnitude of the current of the pulses generated by Faraday generators 4 and sent to the microcontroller through microcontroller ports 30A, 30B and 30C; a capacitor and another resistor connected to ground that are used to shape the Faraday pulses; and a Zener diode that is used to limit the voltage of the pulses provided to microcontroller 30 to 2.8 volts. In addition to providing filtered pulses to microcontroller 30, each filter 23 also provides the same filtered pulses to an OR gate 27, which sends the Faraday pulses coming from any of the three filters 23 to power controller 26. Initially, as noted above, an initial pulse produced by one of the Faraday generators, is used to initialize power controller 26 by biasing the FET switch which supplies battery power to the microcontroller. Initialization of the microcontroller commences by starting an oscillator within the microcontroller that sends pulses to power controller 26 through gate 30E in order to supply bias to the FET's gate, which causes the power controller 26 to remain open until gate 30E is closed, preventing the pulses from the oscillator from being sent to the power controller 26. Initialization of microcontroller is generally completed by: opening ports 30A, 30B and 30C; starting signal frequency generator timer 33; resetting rate of change timer 34 and motion detector timer 35; resetting analog signal to digital signal converter 31; and programming the microcontroller by storing a program in its memory for executing the sound generation processes of the sound generation apparatus 1. As used hereinafter, the alternating current electrical pulses generated by the Faraday generators 4 that is converted to the direct current electrical pulses produced by the bridge rectifiers 21 will be referred to as the "Faraday pulses".

Figure 4B:
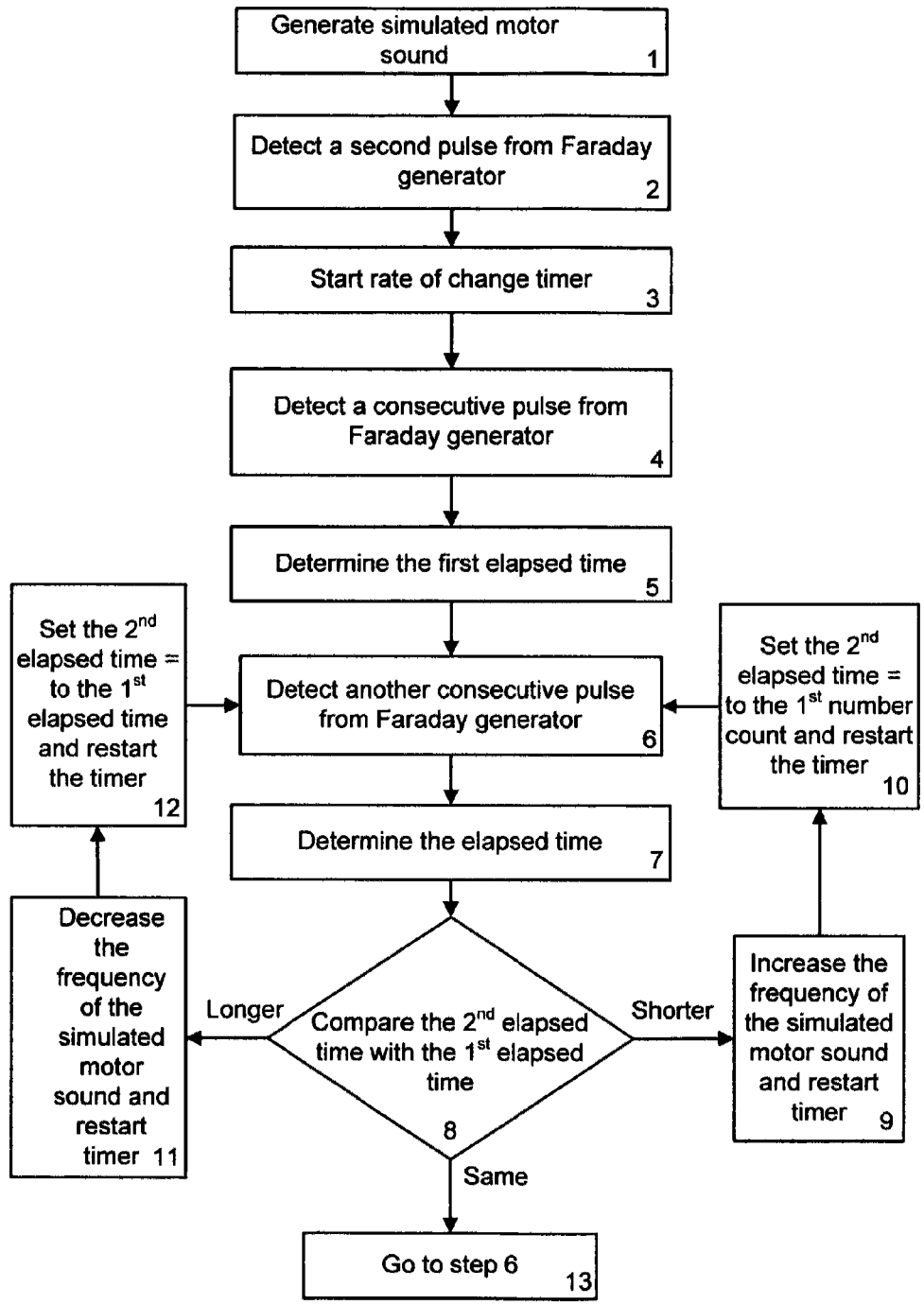
FIG. 4B is a flow chart illustrating an operation of the programmed microcontroller that is part of the circuit illustrated in FIG. 4 and related to the production of a simulated motor sound.

Operation of programmed microcontroller 30 with the vehicle moving in a forward direction, as illustrated in the flow chart of FIG. 4B, will now be described. As described above, as soon as the electric vehicle starts to move in a forward direction and one of the Faraday generators 4 approaches a vertical alignment, the generator's magnetic cylinder 10 will fall down under the force of gravity through channel 7 and copper coil 9 of tubular housing 5, ultimately producing the initial Faraday pulse, which is used to activate the power controller, which begins supplying battery power to the microcontroller, which in turn performs the initialization process described above. It will be arbitrarily assumed for present purposes that the initial Faraday pulse was generated by the Faraday generator 4 that is connected to port 30C as depicted on FIG. 4. In this regard, it is noted that the initial Faraday pulse of electricity will not be actually detected at port 30C because the initial Faraday pulse is used to start the process of initializing the microcontroller. After the microcontroller is initialized, it can be used, as illustrated in FIG. 4B, to generate a simulated motor sound and to adjust the tonal quality of the sound based upon whether the vehicle is accelerating or decelerating. More specifically, at step 1 of FIG. 4B, the microcontroller uses the signal frequency generator timer 33 to generate an audio signal from the current being supplied by battery 24 and sends the audio signal to audio amplifier 32, which in turn sends an amplified signal to speaker 12, which produces the simulated motor sound as an electronic buzzing sound. Preferably, the initial buzzing sound is produced by the signal frequency generator timer 33 by generating a 50 Hz square wave signal having a signal duty cycle of 50%. As the vehicle continues to move, control is passed to step 2 where the programmed microcontroller detects a second Faraday pulse, after the initial Faraday pulse, from one of the Faraday generators at either microcontroller port 30A, 30B or 30C and an analog to digital converter 31 converts the Faraday pulse from an analog signal to a digital signal. However, since it was assumed above that the initial Faraday pulse, which was used to initiate the supply of power to the microcontroller, was supplied by the Faraday generator connected to port 30C, this second Faraday pulse will be detected by the microcontroller at port 30A, because for vehicles moving in a forward direction the Faraday generators send consecutive Faraday pulses in a sequential order to the ports (e.g. 30A, 30B, 30C, 30A, 30B, 30C, 30A etc.)

Control then passes to step 3 of FIG. 4B where the programmed microcontroller 30 starts the rate of change counter 34, which is used to determine the time period between consecutive Faraday pulses arriving at ports 30A, 30B, and 30C. And, as the vehicle continues to move the microcontroller detects, at step 4, a consecutive Faraday pulse at port 30B and converts the Faraday pulse from an analog signal to a digital signal. Next, at step 5 the programmed microcontroller determines a first elapsed time, as a number count indicated by the rate of change timer, between the detection of the second Faraday pulse at port 30A and the detection of the consecutive Faraday pulse at port 30B. Then at step 6 the microcontroller detects another consecutive Faraday pulse at port 30C and converts the Faraday pulse from an analog to a digital signal. Next, at step 7 the microcontroller determines a second elapsed time that is equal to the time period between the detection of the last two consecutive Faraday pulses, i.e. the time period between the detection of the Faraday pulses at ports 30B and 30C. At step 8, the microcontroller compares the first elapsed time to the second elapsed time. If the first elapsed time is longer than the second elapsed time, indicating that the vehicle is accelerating, control passes to step 9 where the microcontroller increases the frequency of the audio signal being generated by the signal frequency generator timer 33 by an amount that is proportional to how much shorter the second elapsed time is, when compared to the first elapsed time. More specifically, the signal frequency generator timer 33 can produce the simulated motor sound having a frequency range from 50 Hz to 200 HZ. In this regard, when the vehicle first starts moving in a forward direction and the microcontroller starts generating the sound, as in step 1 of FIG. 4B, the sound is produced at approximately 50 Hz in order to simulate the sound of the vehicle operating at a low RPM. It has been calculated that the Faraday generators 4 of apparatus 1 will continuously produce Faraday pulses until the vehicle reaches a velocity of about 25 miles/hour, when the centrifugal forces acting on the magnetic cylinders 10 overcome gravity and prevent the cylinders from dropping through the copper coils 9. At this point, sound generation will be discontinued and the microcontroller will be turned off as described in connection with FIG. 4C below. If it is assumed that an average driver will increase the vehicle's speed at a relatively uniform rate of 5 miles/hour/second, then it is estimated that it will take the driver approximately 5 seconds to reach 25 miles/hour. Accordingly, it is possible to calculate a frequency rate of change value by dividing 150 Hz (the frequency range between 50 Hz and 200 Hz) by 5 seconds (the time to accelerate from a stop to 25 miles/hour), which equals 30 Hz/sec. By using this frequency rate of change value, the change in the elapsed time ($\Delta T$) between consecutive Faraday pulses determined in step 8 of FIG. 4B can be converted to an incremental frequency value by multiplying 30 Hz/sec by $\Delta T$. The incremental frequency value can then be used to incrementally increase or decrease the frequency of the audio signal being generated by the signal frequency generator timer 33. For example, if the frequency of the sound being generated by apparatus 1 is 75 Hz and at step 8 of FIG. 4B it is determined that the second elapsed time is 0.1 seconds less than the first elapsed time, meaning that the vehicle is accelerating, then the incremental frequency value is calculated by multiplying 30 Hz/sec by 0.1 seconds, giving a value of 3 Hz, which can then be used to increase the audio frequency of the sound being generated to 78 Hz, as in step 9 of FIG. 4B.

At step 10, the microcontroller 30 sets the second elapsed time to equal to the first elapsed time and restarts the timer. Control then returns to step 6 where the microcontroller again detects another consecutive Faraday pulse, this time at port 30A, and the process of detecting Faraday pulses continues so long as the vehicle continues to move. However, if at step 8 it is determined that the second elapsed time is longer than the first elapsed time, indicating that the vehicle is decelerating, control passes to step 11 where the microcontroller decreases the frequency of the audio signal being generated by the signal frequency generator timer 33 by an amount that is proportional to the how much longer the second elapsed time is, when compared to the first elapsed time. In this regard, the algorithm described above can also be used to decrease the audio frequency. Then at step 12 the second elapsed time is set to equal the first elapsed time, the timer is restarted, and control returns to step 6. However, if at step 8, it is determined that the second elapsed time is the same as the first elapsed time, meaning that the vehicle is moving at a constant velocity, there is no need to modify the frequency of the audio signal, and control passes to step 13 where the microcontroller returns control to step 6, where another Faraday pulse is detected.

The modification of the audio signal frequency as described above causes the buzzing sound produced by speaker 12 to have a higher or lower frequency depending on the rate of change of the vehicle's velocity. The higher frequency buzzing sound is intended to create the audio impression or tonal quality of an accelerating vehicle, while the lower frequency buzzing sound creates the audio of a decelerating vehicle. As will be apparent to those skilled in the art, other types of simulated motor sounds could also be generated by frequency generator 33 by producing frequencies having, for example triangular waves, saw-tooth waves or combinations thereof. In addition, programs can be used by the microcontroller to shape the square waves in order to produce ring tone type tones.

As long as power controller 26 continues to supply power from battery 24 to microcontroller 30, the microcontroller will continue to generate an audio signal and pass the signal to speaker 12 that produces the simulated motor sound as a buzzing sound. As a result, even after the vehicle stops and the Faraday generators 4 stop generating Faraday pulses, battery 24 will continue to supply power, through power controller 26, to the microcontroller that will continue to produce sound, at least until the battery becomes discharged. Accordingly, the microcontroller is also programmed to determine whether a Faraday pulse arrives at port 30A, 30B or 30C within certain time periods, and if not, to first turn off the simulated motor sound and then turn off the microcontroller. This process is illustrated in FIG. 4C and is carried out simultaneously by the microcontroller while it is executing the process described in FIG. 4B.

Figure 4C:
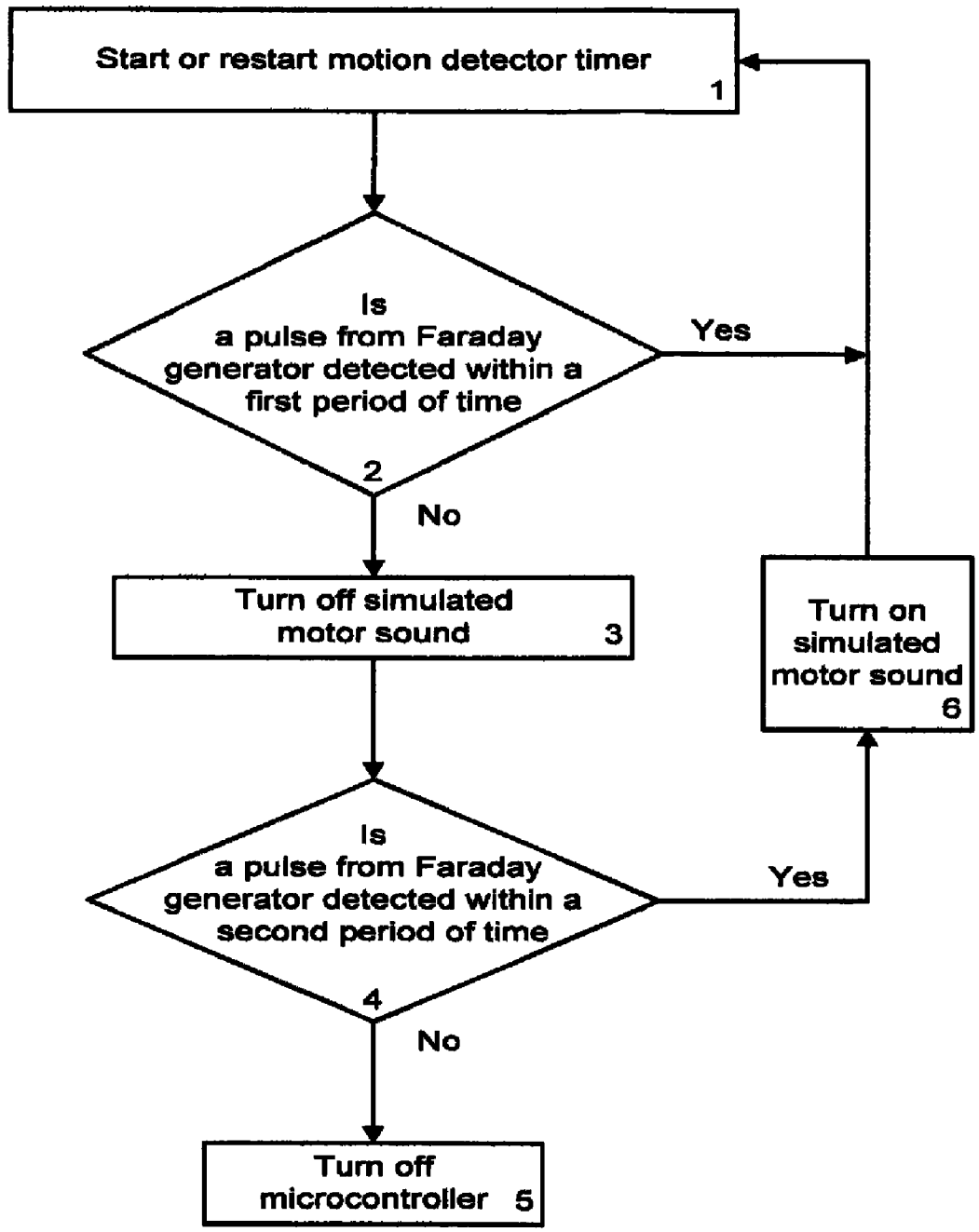
FIG. 4C is a flow chart illustrating another operation of the programmed microcontroller that is part of the circuit illustrated in FIG. 4 and related to turning off the simulated motor sound.

The process starts at step 1 of FIG. 4C, where the microcontroller starts the motion detector timer 35, and then at step 2 the microcontroller determines whether a Faraday pulse from one of the Faraday generators 4 is received at either port 30A, 30B or 30C within a first period of time, for example within 2 seconds. In this regard, for sound generation apparatus 1 using three Faraday generators as illustrated in FIG. 1, the time between consecutive Faraday pulses for forward vehicle motion will vary from about 1 second at slow vehicle speeds to about 1/60 of a second for higher speeds. Accordingly, the first time period is selected such that it is longer than the time period between Faraday pulses at slow vehicle speeds.

If a Faraday pulse is detected, the vehicle is still moving because the Faraday generators 4 are still rotating. Control is then returned to step 1 where the motion detector timer 35 is restarted and at step 2 the microcontroller again determines whether a Faraday pulse is detected within 2 seconds. In this manner, the microcontroller 30 continues to repeat the process of determining whether a Faraday pulse is received within any consecutive 2 second interval. If a Faraday pulse is not detected within 2 seconds, it is assumed that the driver of the vehicle intends to remain stopped for an extended period, and as illustrated in step 3, the microcontroller turns off the simulated motor sound by closing the audio gate 30D. Control then passes to step 4 where the microcontroller continues to determine whether a Faraday pulse from one of the Faraday generators 4 is received at either port 30A, 30B or 30C, but this time the microcontroller determines if a Faraday pulse is received within a second, longer period of time, for example within 15 seconds. If a Faraday pulse is not detected, meaning that the vehicle has not started moving again within the time period, control passes to step 5 where the microcontroller is turned off by closing gate 30E. However, if a Faraday pulse is detected, it means that the vehicle has started moving again and control passes to step 6 where the simulated audio sound is turned back on by opening audio gate 30D. Control then returns to step 1 where the motion detector timer 35 is restarted and the process is repeated.

Although sound generation apparatus 1 has been described in one embodiment with three faraday generators, other embodiments can include the utilization of either more or less than three faraday generators, with each generator attached to a mounting plate having a corresponding number of radially extending arms. For example, if a two faraday generator embodiment is used, the two generators would be connected to a mounting plate with two radially extending arms, and the generators would produce four Faraday pulses per revolution of the wheel of an electric vehicle, as opposed to producing six Faraday pulses per revolution in the three generator embodiment. A difference in operation between a sound generation apparatus having three faraday generators as opposed to two faraday generators is that, after the electric vehicle starts to move, the three generator embodiment will produce sound sooner than a two generator embodiment. In the same manner, a four or higher number of faraday generators will produce sound sooner than the three generator embodiment with each additional faraday generator producing sound sooner than a lesser number. Further, it would also be feasible to use a single Faraday generator, however, in that instance the generator would need to be attached to the center of the mounting plate in order prevent the generation of excessive vibration as the apparatus 1 is rotated when connected to a rotating vehicle wheel. An additional limitation of the use of a single Faraday generator is that the sound modification features described for the three Faraday generator embodiment could not be implemented, those features require two or more Faraday generators. Another difference in the operation of different numbers of faraday generators is that a greater number of generators will produce a more continuous accelerating or decelerating sound as described in connection with FIG. 4B. It will be further apparent to a person skilled in the art that the mounting plate may comprise a generally circularly shaped disk without any arms, with the faraday generators radially positioned on the disk and that the plate may be omitted entirely by incorporating the faraday generators into the wheel structure. In addition, while the use of a single sound generation apparatus 1 attached to the wheel of an electric vehicle has been described, more than one apparatus could be used by attaching additional sound generation devices to two or more wheels, thereby creating the more realistic sound of a vehicle generating sound in all directions.

Further, although sound generation apparatus 1 has been described for an electric vehicle that is moving in a forward direction, the apparatus can also be used to produce a sound when the vehicle is moving in reverse, i.e. in a backward direction. However, since the vehicle is moving in reverse, the generators will be rotating in an opposite direction to the direction of rotation when the vehicle is moving in a forward direction, and the Faraday pulses from the Faraday generators 4 will be delivered consecutively to the microcontroller in an order that is opposite to the order that the Faraday pulses are delivered when the vehicle is moving forward. Although the same simulated motor sound generated for a vehicle moving in a forward direction could also be generated in the same manner for a vehicle moving in a reverse, it would be preferable for safety considerations to generate a different sound for backward motion. This implementation is illustrated in connection with FIG. 4D.

When the vehicle is moving in a forward direction as described in connection with FIG. 4B, the simulated motor sound is generated as soon as microcontroller 30 is initialized. However, when a reverse sound is implemented, as illustrated in connection with FIG. 4D, it is necessary for the microcontroller to initially determine whether the vehicle is moving forward or backward before generating a sound. Thus, after the microcontroller goes through its initialization process as indicated in step 1 of FIG. 4D, but before generating the simulated motor sound, the microcontroller determines at step 2 which port (i.e. 30A, 30B or 30C) receives a second Faraday pulse (i.e. the Faraday pulse after the initial Faraday pulse) from one of the Faraday generators. The port so identified is referred to herein as the First Port. Then at step 3, the microcontroller detects a consecutive Faraday pulse after the second Faraday pulse at another port, which is referred to herein as the Second Port. Control then passes to step 4 where the microcontroller determines whether the sequence from the First Port to the Second Port is from C to B, B to A or A to C. If any of those conditions are met, meaning that the vehicle is moving in a reverse direction, control passes to step 5 where it is determined if the simulated motor sound is being generated, which would occur if the vehicle was moving in a forward direction before starting to move in reverse. If so, at step 7 the simulated motor sound is turned off and control passes to step 6. If the motor sound is not being generated, at step 6 a reverse sound is generated or continued as an intermittent beeping sound. More specifically, the signal frequency generator timer 33 generates the beeping sound from a signal having a series of 500 Hz square waves with each series having a cycle rate of one-half second on and one-half second off. Then at step 8, the First Port is reset as the Second Port and control is returned to step 3 where the microcontroller detects another consecutive Faraday pulse and repeats the process.

Figure 4D:
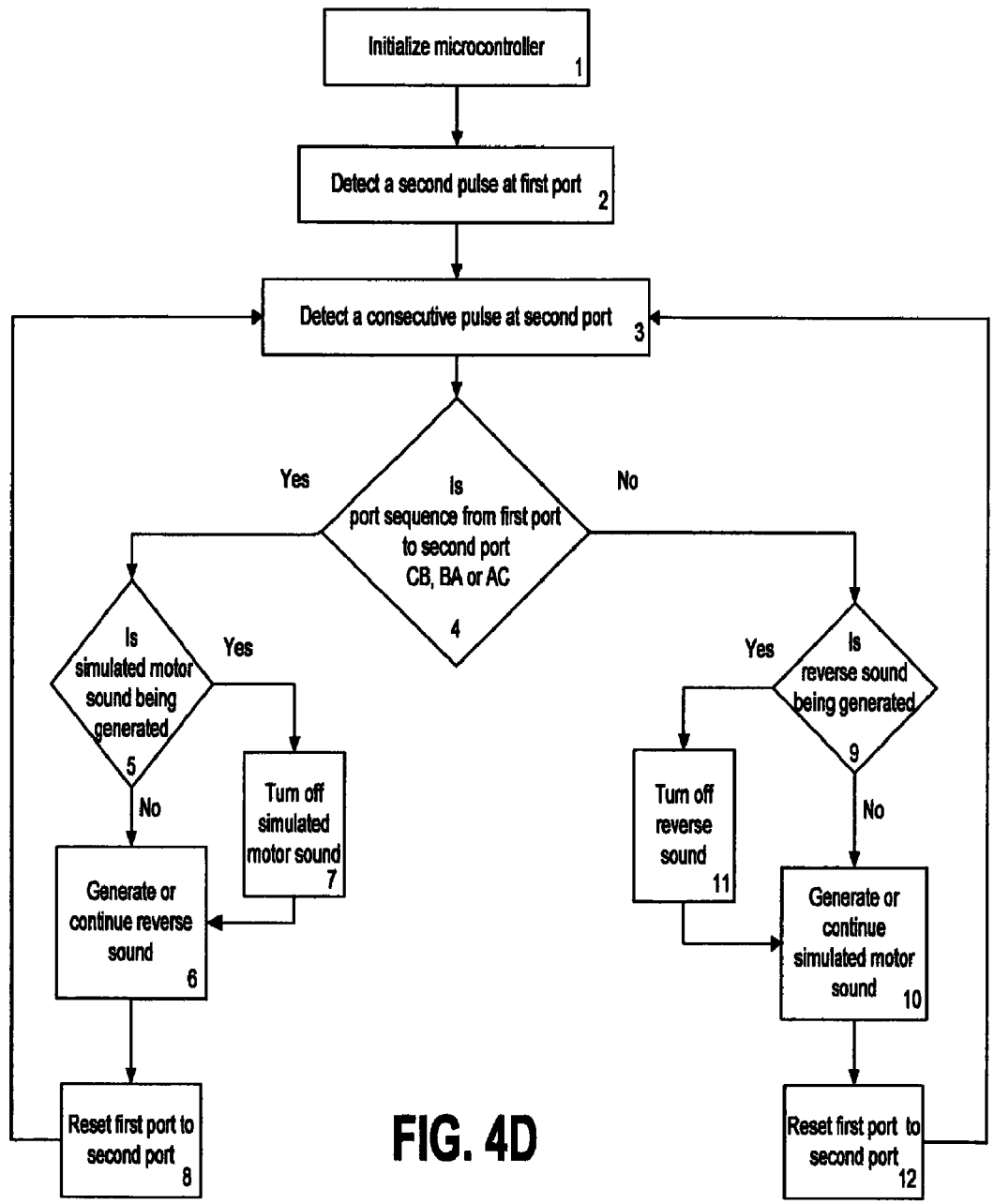
FIG. 4D is a flow chart illustrating another operation of the programmed microcontroller that is part of the circuit illustrated in FIG. 4 and related to generating a different sound when the vehicle is moving in a backward direction.

However, if at step 4 in FIG. 4D the port sequence is determined to be from A to B, B to C, or C to A, meaning that the vehicle is moving in a forward direction, control passes to step 9 where it is determined if the reverse sound is being generated, which would occur if the vehicle was moving in reverse before starting to move forward. If so, at step 11 the reverse sound is turned off and control passes to step 10. If the reverse sound is not being generated, at step 10 the simulated motor sound is generated or continued as described in connection with FIG. 4B. Then at step 12 the First Port is reset as the Second Port and control is returned to step 3 where the microcontroller detects another consecutive Faraday pulse and repeats the process.

Figure 5:
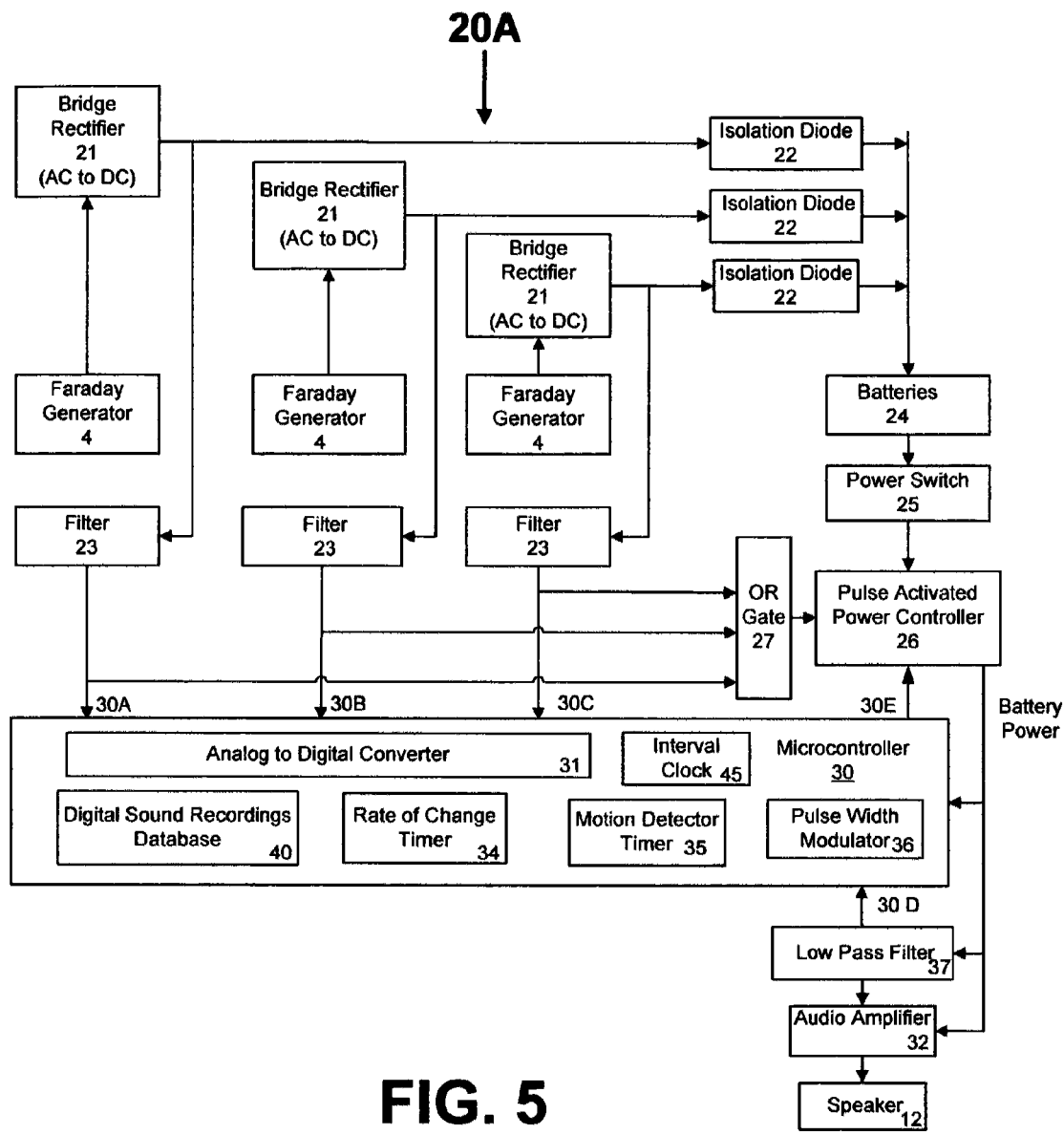
FIG. 5 is a schematic diagram of the electric components and circuitry that is used to generate an actual motor sound for an electric vehicle.

In addition to generating a simulated motor sound as described above, in another embodiment the sound generation apparatus 1 includes the feature of generating an actual motor sound using digital recordings of actual motor sounds. This embodiment is illustrated in FIGS. 5 through 5D. FIG. 5 illustrates a sound generation circuit 20A, which is the same as circuit 20 described in connection with FIG. 4 with the exception that signal frequency generator 33 is replaced by a digital sound recordings database 40, containing the sounds generated by an automobile engine operating at different engine speeds or angular velocities. In addition, sound generation circuit 20A includes a pulse width modulator 36, a low pass filter 37, and interval clock 45; operation of these devices will be described in more detail in connection with the description of FIGS. 5A and 5B.

The process described in FIG. 5A utilizes digital sound recordings database 40 stored in the memory of microcontroller 30, more specifically illustrated in FIG. 5B. The database can be created by digitally recording the actual motor sound of a combustion automobile engine accelerating at constant engine speed from an idle speed of, for example, 500 RPM and, while the vehicle in a neural gear, accelerating the engine up to approximately 1,500 RPM within 5 seconds. It is noted that other combustion engines operating at different engine speeds could also be digitally recorded. The recording can be produced by first recording the sound clips of the engine operating at a predetermined number of engine speeds, for example 10 different engine speeds, for a certain time period, for example 60 seconds. Then for each 60 second sound clip, a single one-half second sound clip can be selected that reproduces the most consistent sound, with each one-half second clip associated with the engine speed that generated the sound. Although one-half second sound clips are preferred, clips having other durations could be used. For present purposes, however, it is the angular velocity of the vehicle's wheels that is needed, rather than the engine speed or angular velocity of the engine. As will be described below, it is the angular velocity of the Faraday generators that must be compared to the angular velocity of the vehicle's wheels in order to select and playback an engine sound that most closely matches the sound produced by an engine operating at the same angular velocity. This conversion can be readily carried out using the formula: $(RPM \times R)/(R1 \times R2)$, where RPM is the angular velocity of the engine, R is the radius of a wheel or any point along the radius of the wheel, R1 is the transmission gear ratio, and R2 is the rear axle ratio. The resulting RPM values are then converted to revolutions/second (RPS) so that they can be compared to the angular velocity of the Faraday generators which, as will be described below, is measured in revolutions/second. This data is then stored in the digital sound recordings database 40 in the memory of microcontroller 30 as illustrated in FIG. 5. The idle sound clip is associated with an engine idle speed; the next sound clip (sound clip-1) is associated with the initial angular velocity of the vehicle's wheels (RPS-1) that has been calculated based upon an initial engine speed; the next sound clip (sound clip-2) is associated with the next angular velocity of the vehicle's wheel's (RPS-2) and so on until sound clip-10 is associated with RPS-10. For present purposes, a reference to a "sound clip" shall mean to a sound clip of the vehicle moving in forward direction, while the sound clip for the vehicle traveling in reverse shall be referred to as a "reverse sound clip"

Although the methodology of creating sound clips from the sound of a combustion engine operating at various engine speeds while the vehicle is in neutral will give a reasonable representation of the actual sound produced by a vehicle as if it were in motion, it is apparent that more representative motor sounds might be reproduced by recording the sound clips of a vehicle that is actually moving. However, it would not be appropriate to record the sound of a vehicle while it is being operated on a road, because the recording would pick up road noise. Obviously, road noise should not be recorded, since road noise is produced by an electric vehicle, just like any other vehicle. As a result, it might be appropriate, for example, to record sound clips while the vehicle is suspended off the ground using a hydraulic lift so that the clips also include the sounds generated by the transmission, differential, and other sounds generated by a moving vehicle, but excludes the sound produced by road noise. In this example, the angular velocity of the wheels could be measured directly, with each velocity associated with a sound clip. Similarly, the sound of a suspended vehicle changing gears could be recorded at certain predetermined times, with sound clips associated with the predetermined times in a database. Then the sound clips could be played back at the predetermined times, in coordination with sound clips associated with a specific angular velocity.

At the time the vehicle first starts moving in a forward direction and an initial Faraday pulse is produced by a Faraday generator 4, microcontroller 30 at step 1 of FIG. 5A starts interval clock 45, which is programmed to repeat a predetermined time interval, for example a one-half second interval. This time interval is selected to be equal to the time period of the recorded sound clips stored in database 40 and is used to determine if the playback of any sound clip should be repeated before another sound clip is played. At step 2 and simultaneously with the start of interval clock 42, the microcontroller selects the idle sound clip from database 40 and plays the recording by initially sending the sound clip signal, represented in digital data form, to pulse width modulator 36. The pulse width modulator then converts the digital data to an electronic digital signal having a pulse width modulated cycle that is based upon the average voltage values of the digital signal. Next, the microcontroller sends the digital signal to low pass filter 37, which converts the digital signal to an analog signal. The analog signal is then sent to amplifier 32 and speaker 12, resulting in the playback of the idle sound clip. After the one-half second idle sound clip starts playing, it will continue to do so until the motion of the vehicle reaches a certain speed at which another sound clip will be played. This process starts in step 3 where the microcontroller determines if a Faraday pulse has been received before the expiration of the interval clock's first one-half second interval. If no Faraday pulse is received, meaning that the vehicle is moving very slowly or has stopped, the microcontroller at step 9 restarts interval clock 45 and replays the one-half second idle sound clip. This process continues until a Faraday pulse is detected by the microcontroller within the first one-half second interval. When a Faraday pulse is detected, the rate of changer timer 34 is started at step 4. Then at step 5, the microcontroller determines whether another Faraday pulse is detected before the expiration of the first one-half second interval. If not, control again returns to step 9 and the process repeats. If a another Faraday pulse is detected at step 5, then control passes to step 6 where the microcontroller determines the elapsed time between the last two consecutive Faraday pulses and at step 7 calculates the rate of revolution of the three Faraday generators in seconds (Faraday RPS=1 revolution/(elapsed time×6). At step 8 it is then determined if the Faraday RPS is greater than the idle speed. If it is not greater, again meaning that the vehicle is still moving slowly or has stopped, control again passes to step 9. However, if the Faraday RPS value is greater than the idle speed, meaning that the vehicle is accelerating, control passes to step 10 where another one-half second sound clip is selected from database 40 having an RPS value that most closely matches the Faraday RPS determined in step 7. Then at the end of the first one-half second time interval, play back of the one-half second idle sound clip is allowed to stop, and at step 11 the microcontroller starts playing, simultaneously with the start of the next one-half second time interval, the sound clip identified as step 10 (e.g. sound clip-1 from database 40). At step 12, the microcontroller determines if another Faraday pulse is detected before the expiration of the next one-half second time interval (i.e. after an elapsed time of one second on interval clock 45). If not, at step 18 the microcontroller replays the sound clip and control returns to step 12 where the process repeats. If another Faraday pulse is detected, however, at step 13 the microcontroller determines the elapsed time between the last two consecutive Faraday pulses (i.e. the Faraday pulses detected at steps 5 and 12). Then at step 14 the microcontroller calculates the rotational speed of the Faraday generators (Faraday RPS), as described above, and compares the speed at step 15 to the idle speed. If the Faraday RPS is greater than the idle speed, then at step 16 the microcontroller uses database 40 to again select a sound clip (e.g. sound clip-2) having an associated rotational speed that most closely matches the rotational speed of the Faraday generators calculated at step 14. After the expiration of the current one-half second time interval, playback of the sound clip identified in step 11 is allowed to stop, and simultaneously the sound clip identified in step 16 starts playing. Control then returns to step 12 where the microcontroller determines if another Faraday pulse is detected before the expiration of the next one-half second time interval. If at step 15, however, the microcontroller determines that the rotational speed of the Faraday generators is not greater than the idle speed, meaning that the vehicle is, once again, idling or moving very slowly, control passes to step 19 where at the end of the current time interval the sound clip identified at step 11 is allowed to stop. Simultaneously, interval clock 45 is restarted and control returns to step 2 where the idle sound clip is again played. These processes will continue until either of the conditions described in connection with FIG. 5C discussed below are satisfied.

Figure 5C:
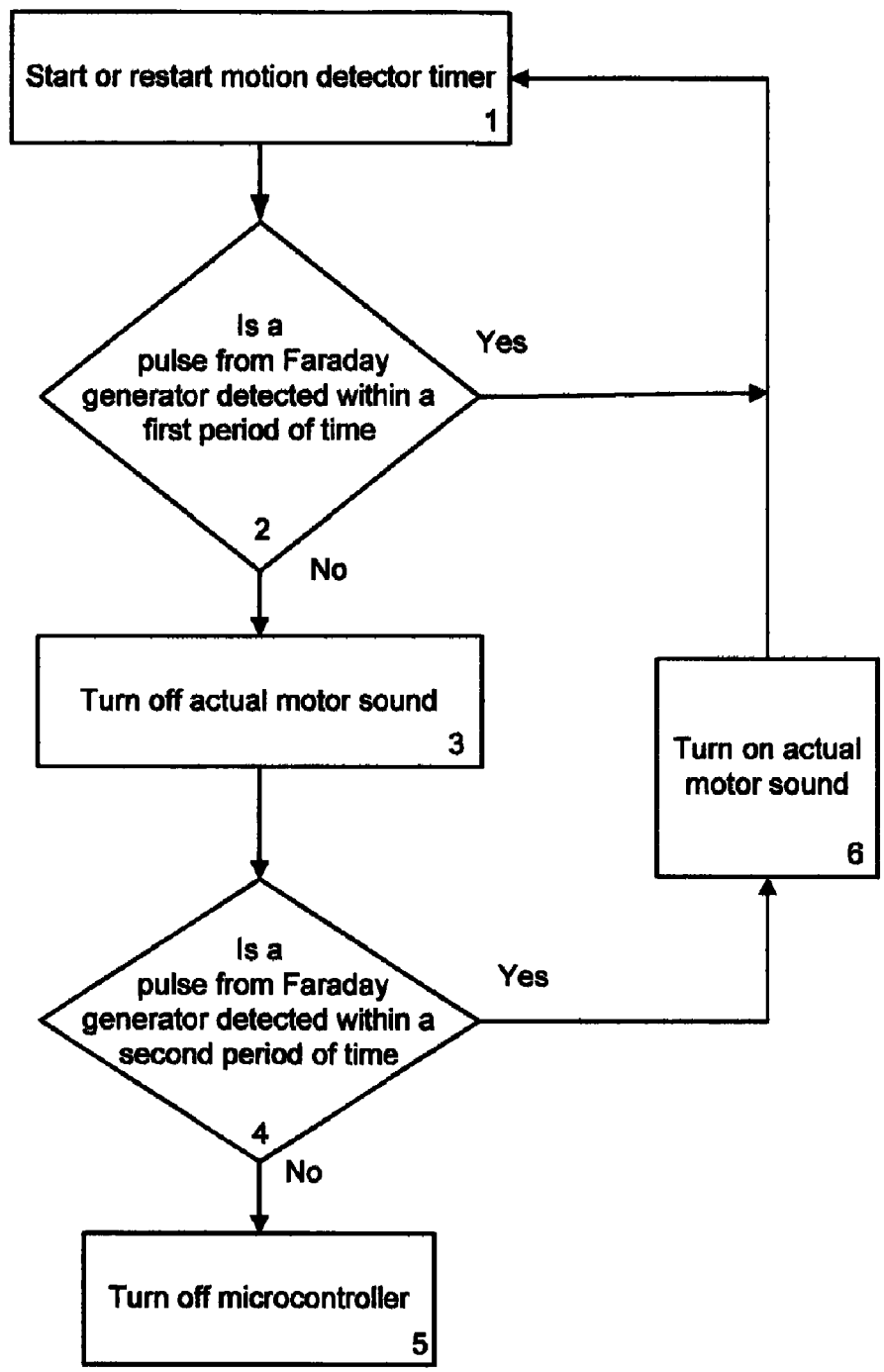
FIG. 5C is a flow chart illustrating another operation of the programmed microcontroller that is part of the circuit illustrated in FIG. 5 and related to turning off the actual motor sound.
Figure 5D:
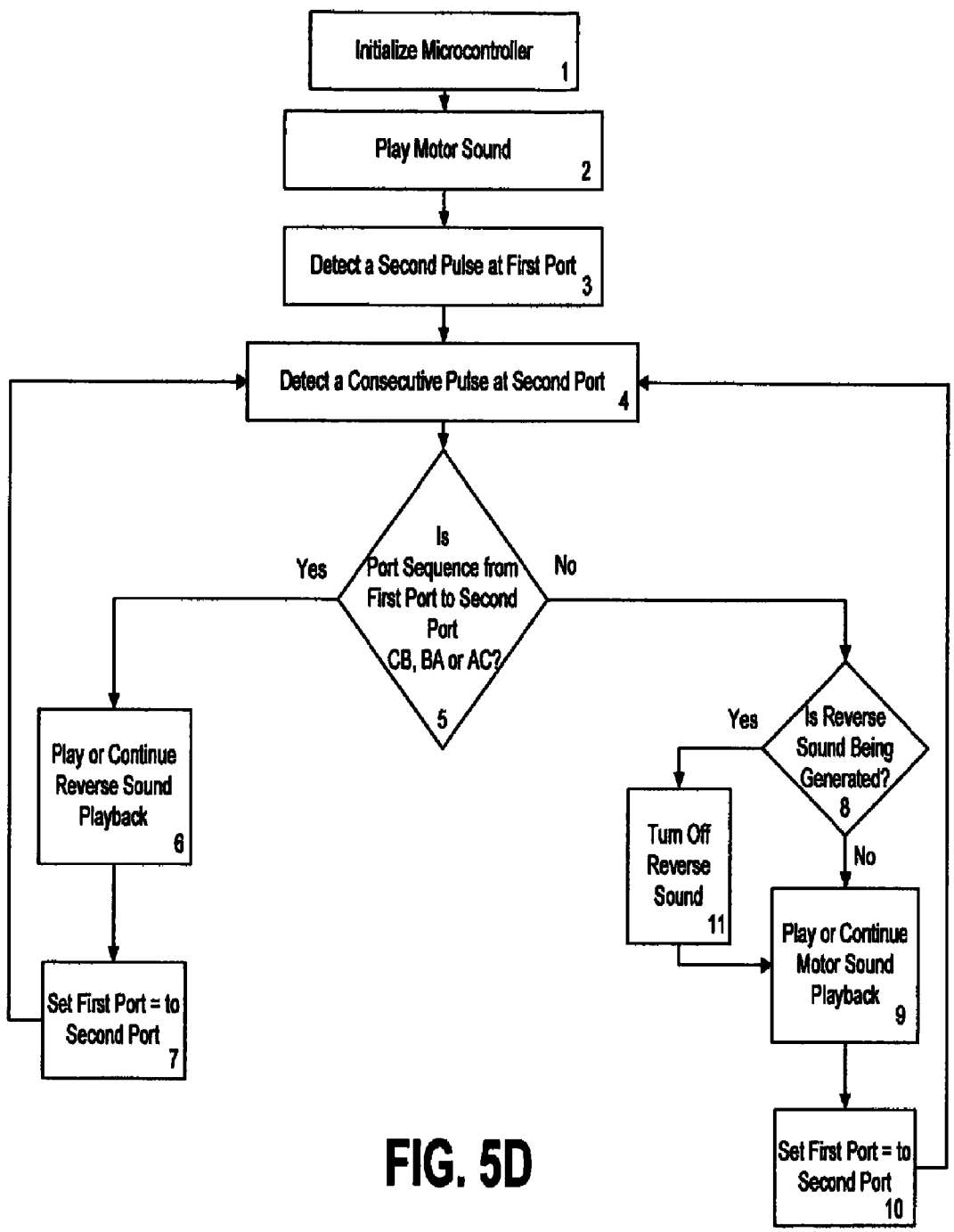
FIG. 5D is a flow chart illustrating another operation of the programmed microcontroller that is part of the circuit illustrated in FIG. 5 and related to generating a different sound when the vehicle is moving in a backward direction.

FIG. 5C describes the process of turning off the actual motor sound or turning off the microcontroller 20 and is carried out simultaneously by the microcontroller while it is executing the process described in FIG. 5A. At the time the programmed microcontroller 30 is initialized, a motion detector timer 35 is started. This timer is used by the microcontroller to determine whether the actual motor sound should be turned off because the vehicle has stopped moving. The process starts at step 1 of FIG. 5C, where the microcontroller starts the motion detector timer 35, and then at step 2 the microcontroller determines whether a Faraday pulse from one of the Faraday generators 4 is received at either port 30A, 30B or 30C within a first period of time, for example within 2 seconds. In this regard, for sound generation apparatus 1 using three Faraday generators as illustrated in FIG. 1, the time between consecutive Faraday pulses for forward vehicle motion will vary from about 1 second at slow vehicle speeds to about 1/60 of a second for higher speeds. Accordingly, the first time period is selected such that it is longer than the time period between Faraday pulses at slow vehicle speeds.

If a Faraday pulse is detected, the vehicle is still moving because the Faraday generators 4 are still rotating. Control is then returned to step 1 where the motion detector timer 35 is restarted, and at step 2 the microcontroller again determines whether a Faraday pulse is detected within 2 seconds. In this manner, the microcontroller 30 continues to repeat the process of determining whether a Faraday pulse is received within any consecutive 2 second interval. If a Faraday pulse is not detected within 2 seconds, it is assumed that the vehicle has stopped and, as illustrated in step 3, turns off the actual motor sound by closing the audio gate 30D. Control then passes to step 4 where the microcontroller continues to determine whether a Faraday pulse from one of the Faraday generators 4 is received at either port 30A, 30B or 30C, but this time the microcontroller determines if a Faraday pulse is received within a second, longer period of time, for example within 15 seconds. If a Faraday pulse is not detected, meaning that the vehicle has not started moving again within the time period, control passes to step 5 where the microcontroller is turned off by closing gate 30E. However, if a Faraday pulse is detected, it means that the vehicle has started moving again and control passes to step 6 where the actual audio sound is turned back on by opening audio gate 30D. Control then returns to step 1 where the motion detector timer 35 is restarted and the process is repeated.

The process described in FIG. 5D pertains to generating a sound when the vehicle is moving in a backward direction that is different than the actual sound that is generated in a forward direction as described in connection with FIG. 5A. As soon as the microcontroller 30 is initialized at step 1, the microcontroller at step 2 starts playing the actual motor sound as describe in FIG. 5A. Then at step 3 of FIG. 5D, the microcontroller determines which port (i.e. 30A, 30B or 30C) receives a second Faraday pulse (i.e. the Faraday pulse after the initial Faraday pulse) from one of the Faraday generators. The port so identified is referred to herein as the First Port. Then at step 4, the microcontroller detects a consecutive Faraday pulse after the second Faraday pulse at another port, which is referred to herein as the Second Port. Control then passes to step 5 where the microcontroller determines whether the sequence from the First Port to the Second Port is from C to B, B to A or A to C. If any of those conditions are met, meaning that the vehicle is moving in a reverse direction, control passes to step 6 where the microcontroller plays or continues to play a reverse sound. The reverse sound can be the same as the beeping sound produced in connection with the description of FIG. 4C or it can be a prerecorded beeping sound that is played back from a beeping sound clip stored, as a "reverse sound clip" in database 40, or any other sound appropriate for driving a vehicle in reverse (e.g. reverse sound clip-1, reverse sound clip-2, reverse sound clip-3). Then at step 7 the First Port is reset as the Second Port and control is returned to step 4 where the microcontroller detects another consecutive Faraday pulse and repeats the process. However, if at step 5 in FIG. 5D the port sequence is determined to be from A to B, B to C, or C to A, meaning that the vehicle is moving in a forward direction, control passes to step 8 where it is determined if the reverse sound is being generated, which would occur if the vehicle was moving in reverse before starting to move forward. If so, at step 11 the reverse sound is turned off and control passes to step 9. If the reverse sound is not being generated, at step 9 the actual motor sound is generated or continued as described in connection with FIG. 5A. Then at step 10 the First Port is reset as the Second Port and control is returned to step 4 where the microcontroller detects another consecutive Faraday pulse and repeats the process.

Figure 6:
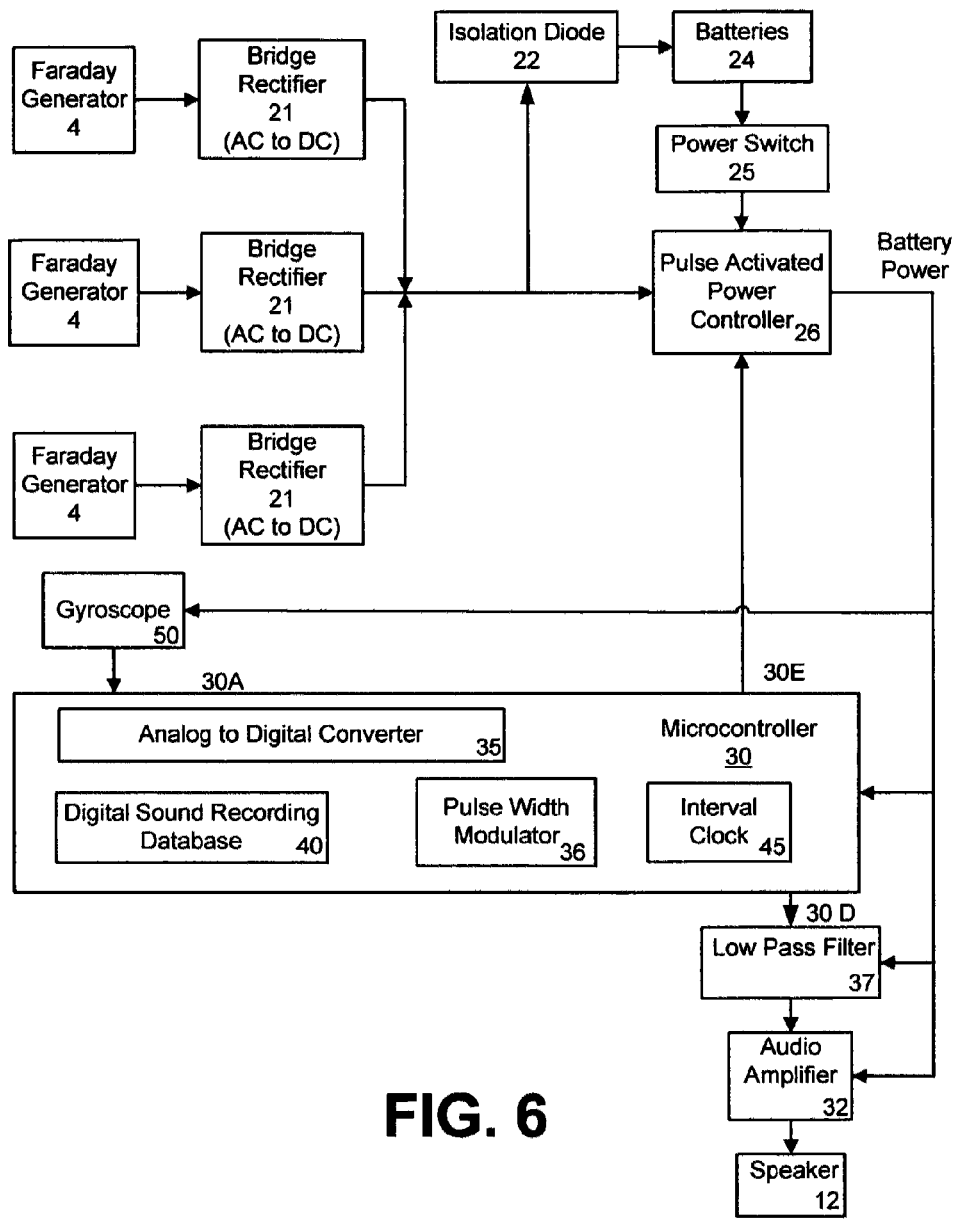
FIG. 6 is a schematic diagram of another embodiment of the electric components and circuitry that is used to generate an actual motor sound for an electric vehicle.

In another embodiment of the sound generation apparatus 1, rather than using the time between Faraday pulses in order to determine whether the electric vehicle is accelerating, decelerating, stopped or moving in a backward direction, an angular rate sensing gyroscope can be used to sense these operational conditions. FIG. 6 illustrates a sound generation circuit that is a modification to the sound generation circuit depicted in FIG. 5 in order to show that an angular rate sensing gyroscope 50 (also shown in dashed lines in FIG. 3) can replace the Faraday pulse inputs at microcontroller ports 30A, 30B and 30C. In this embodiment, gyroscope 50 is used to detect changes in the angular velocity of the rotating Faraday generators. However, the process of generating an actual motor sound is similar to the process described in FIG. 5A.

Figure 6A:
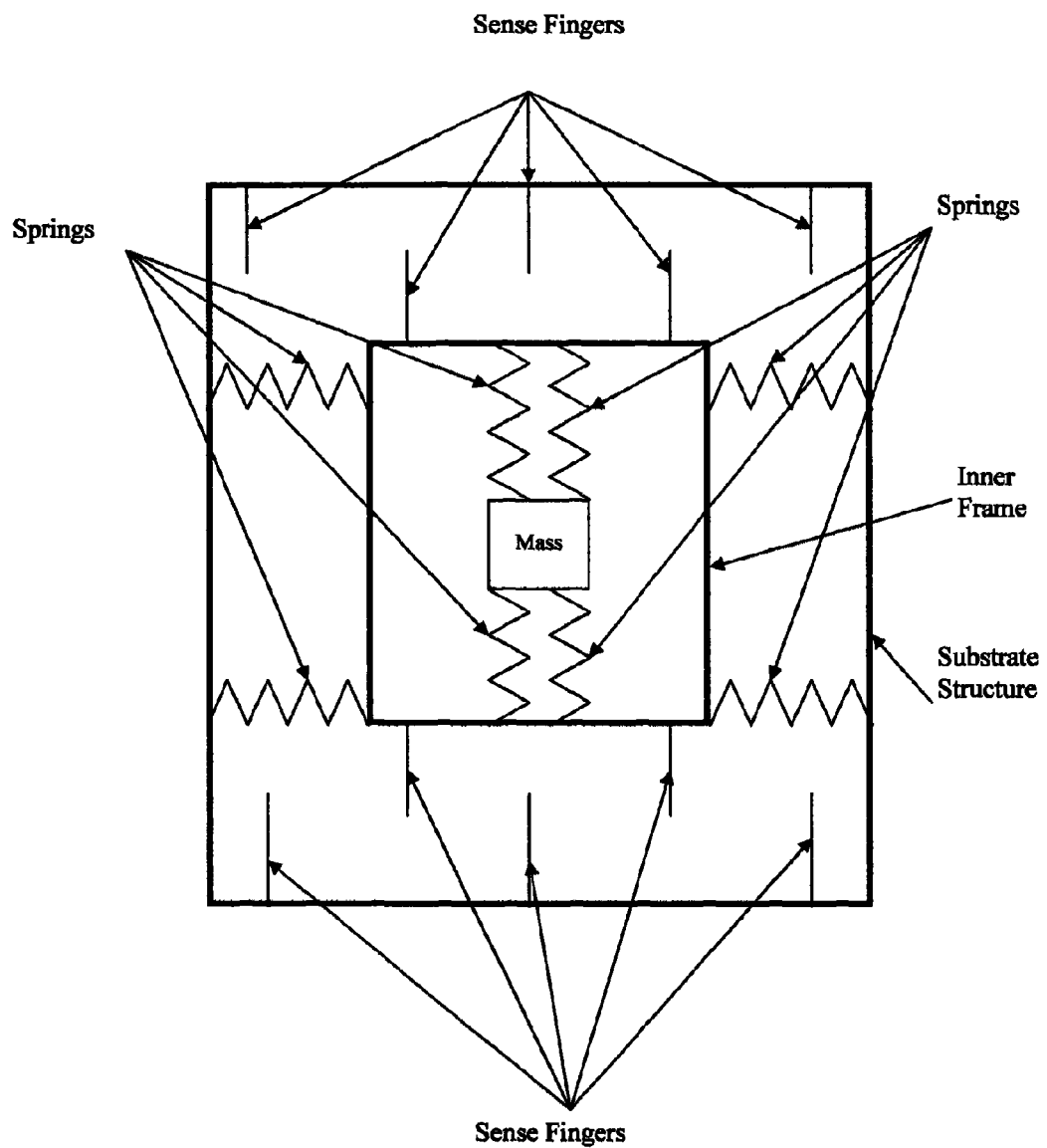
FIG. 6A is a schematic diagram of the angular rate sensing gyroscope that is part of the circuit illustrated in FIG. 6.

A schematic illustration of gyroscope 50 is set forth in FIG. 6A. The gyroscope can include a moveable resonating mass that is spring-loaded in a vertical orientation between the top and bottom surfaces of the inner sides of an inner cubical frame. The inner cubical frame is, in turn, spring loaded in a horizontal orientation between two opposed inner side surfaces of a substrate structure, encasing the inner frame. Sense fingers are positioned on the inner frame and on the outer substrate structure and are used to sense a change in capacitance levels measured between the fingers. When a voltage is applied to the resonating mass, it will begin to oscillate. When the structure is subjected to constant angular velocity, there will be no change of the capacitance between the fingers on the frame and those attached to the substrate. However, when the structure undergoes an angular acceleration or deceleration, a reactive or inertial force on the gyroscope's mass will be generated, which will in turn compress the springs. However, due the Coriolis Effect on the oscillating mass, the differential displacement of the mass will produce a slightly different response in the capacitance between the fingers, which enables the gyroscope to be used to sense whether the mass is rotating in a clockwise or counter clockwise direction. This change in capacitance is converted by the gyroscope to a variable voltage, which can then be used to determine if the gyroscope is experiencing an acceleration or deceleration and whether it is rotating clockwise or counterclockwise. More specifically, when the gyroscope is not rotating, it produces a nominal voltage that is equal to one-half the power supply voltage. When the gyroscope is subjected to an angular velocity while rotating in a clockwise direction, however, the voltage will increase or decrease in proportion to an increase or decrease in its velocity, respectively. However, the voltage will not fall below the level of one-half or above the power supply. On the other hand, when the gyroscope is experiencing a counterclockwise angular acceleration, the voltage will vary between one-half the power supply and zero volts. A gyroscope that would be appropriate for use as angular rate sensing gyroscope 50 is a LY5150ALH 28 pin Yaw Rate Gyroscope, manufactured by STMicroelectronics, Inc, and having a sensitivity of 0.167 mV/°/sec and a full scale voltage of 3.6 volts; however, as will be apparent to those skilled in the art, other gyroscope models with different sensitivities and voltage scales could also be used.

Figure 6B:
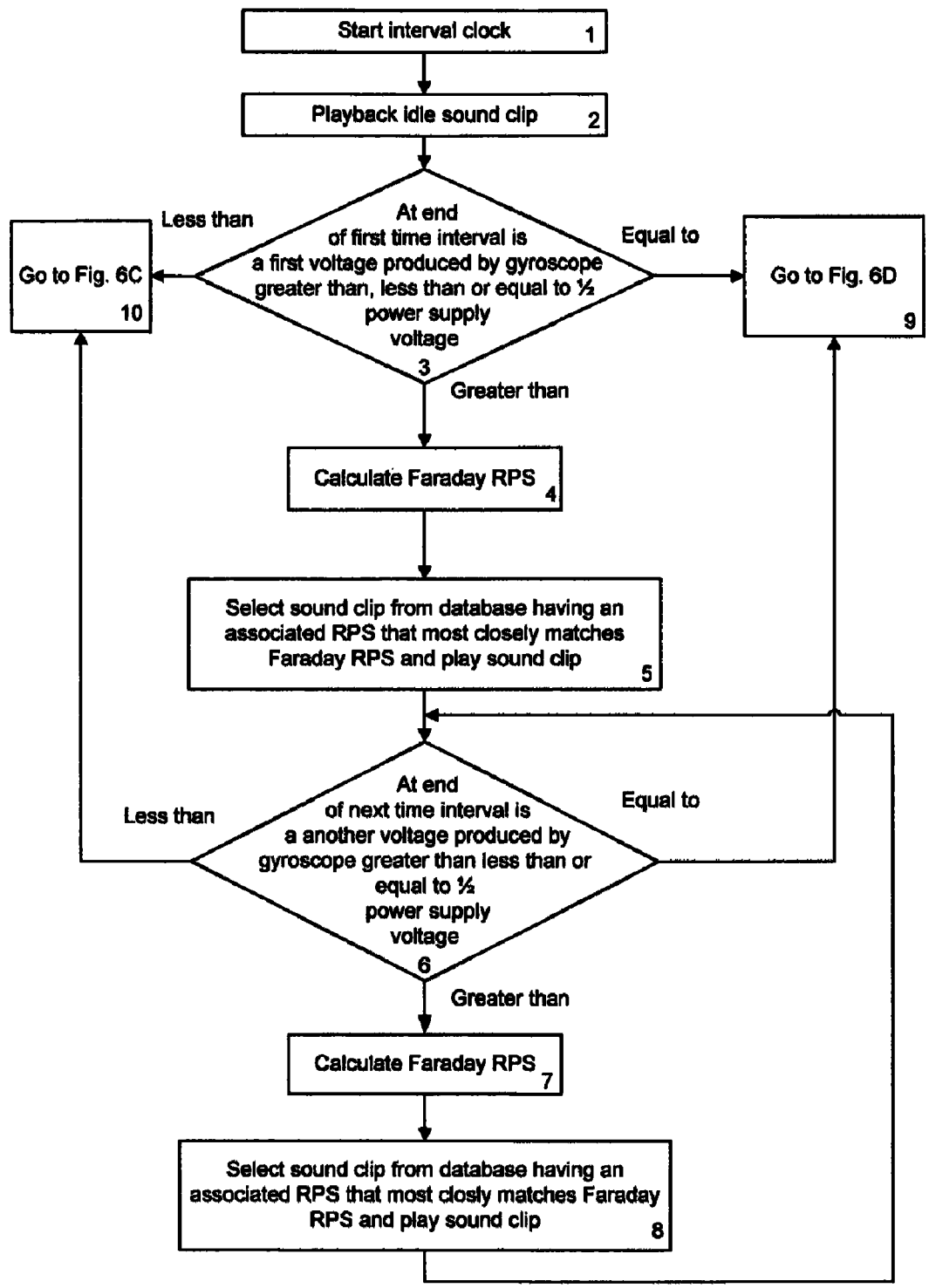
FIG. 6B is a flow chart illustrating an operation of the programmed microcontroller that is part of the circuit illustrated in FIG. 6 and related to the production of the actual motor sound.

Turning now to FIG. 6B, the use of gyroscope 50 in connection with the operation of programmed microcontroller 30 will be described. In this regard, gyroscope 50 can be positioned at any convenient location on circuit board 2B illustrated in FIG. 3. After the microcontroller is initialized, at step 1 time interval clock 45 is started and used to establish the fixed time intervals at which the microcontroller will measure the voltage of the gyroscope. As noted above, the time intervals are selected to equal the recording length of the sound clips stored in database 40. At step 2 the microcontroller begins playing the idle sound clip stored in database 40. Then, as illustrated in step 3, at the end of a first time interval as measured by the interval clock, the programmed microcontroller determines whether a first voltage produced by the gyroscope is greater than, less than or equal to one-half the power supply voltage of the gyroscope. If the voltage is equal to one-half the power supply, indicating that the vehicle is not moving, control passes to step 9, which in turn passes control to the process described in FIG. 6D, where it is determined whether the idle sound clip and microcontroller should be turned off. If the voltage is less than one-half the power supply voltage, meaning that the vehicle is moving backwards or in reverse, control passes to step 10, which in turn passes control to the process described in FIG. 6C, where the reverse sound clip is played simultaneously with the idle sound clip. These processes illustrated in FIG. 6C and FIG. 6D will be described in more detail below.

However, if the first voltage is greater than one-half the power supply voltage, meaning that the vehicle has started to move in a forward direction, control passes to step 4 where the microcontroller calculates the angular velocity of the Faraday generators by using the sensitivity of the gyroscope measured in mV/°/sec. For example, the preferred gyroscope referred to above has sensitivity of 0.167 mV/°/sec. So, if is assumed that the gyroscope produced a first voltage at step 3 of 1.9 volts, representing an increase of 0.1 volts (100 mV) over one-half the power supply of 1.8 volts, the angular velocity of the Faraday generators measured in revolutions/second (RPS) would be 0.046 RPS ((100 mV/0.167 mV/°/sec)/360°/rev). Next, at step 5, the microcontroller selects a sound clip from database 40 having an associated angular velocity value that most closely matches the Faraday RPS value calculated at step 4 and plays the sound clip. Then at the end of the next time interval, as shown in step 6, the microcontroller detects a next voltage produced by the gyroscope and again determines whether the voltage is greater than, less than or equal to the voltage of one-half the power supply. If the voltage is greater than, indicating that the vehicle is still moving in a forward direction, control passes to step 7 where the Faraday RPS is calculated based upon the next voltage value, using the same formula as in step 4 above. At step 8, the microcontroller selects another sound clip from database 40 that has an associated RPS value that most closely matches the Faraday RPS value and plays the sound clip. Control then returns to step 6 where the microcontroller again determines, at the end of the next time interval, whether a next voltage produced by the gyroscope is greater than, less than or equal to the voltage of one-half the power supply and this process continues until the gyroscope voltage detected at step 6 is either equal to or greater than one-half the power supply voltage. If the voltage is equal to one-half the power supply voltage, control again passes to step 9, because the vehicle is not moving. And, if at step 6 the voltage is less than one half the power supply voltage, control again passes to step 10, because the vehicle is now moving in a backwards direction.

Figure 6C:
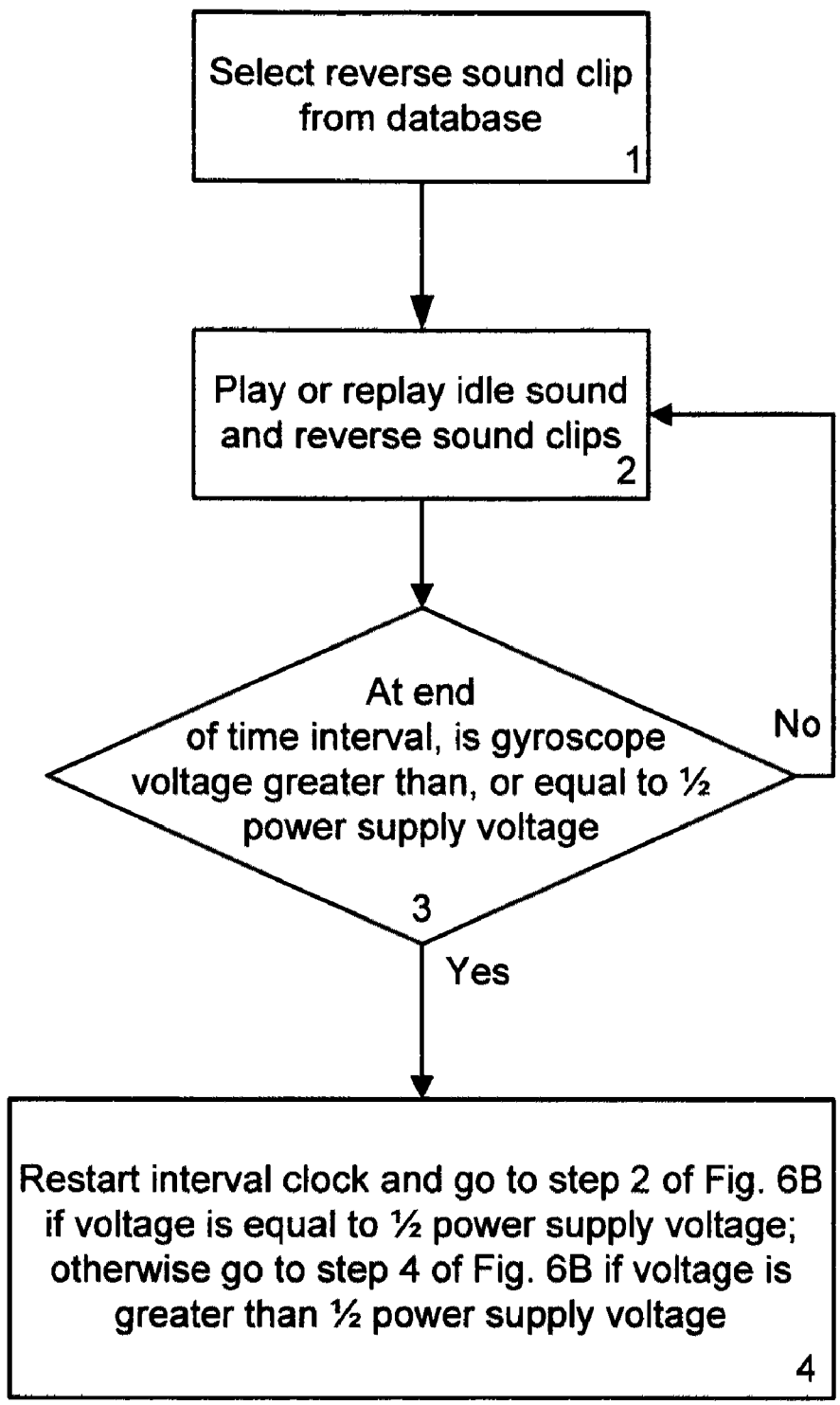
FIG. 6C is a flow chart illustrating another operation of the programmed microcontroller that is part of the circuit illustrated in FIG. 6 and related to generating a different sound when the vehicle is moving in a backward direction.
Figure 6D:
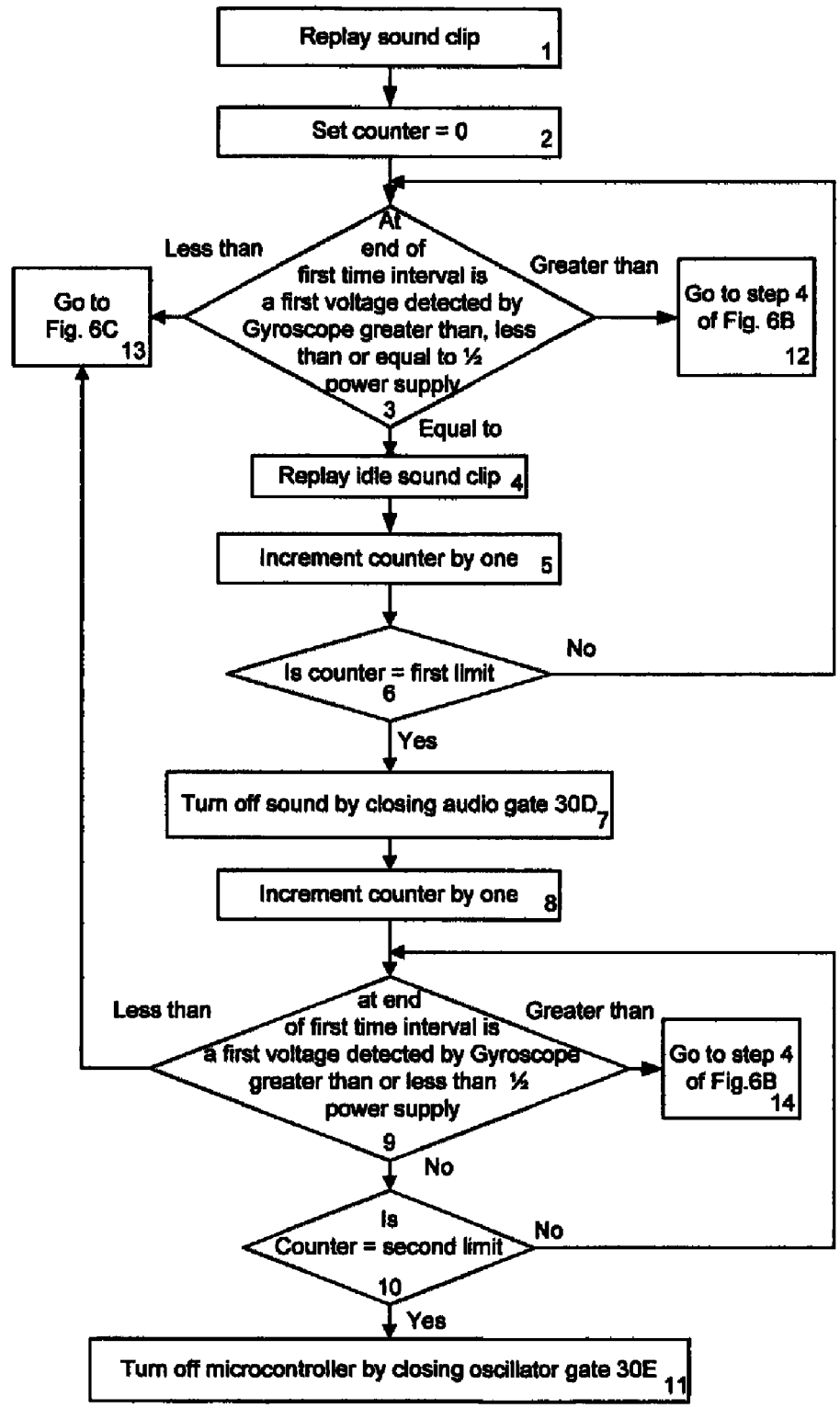
FIG. 6D is a flow chart illustrating another operation of the programmed microcontroller that is part of the circuit illustrated in FIG. 6 and related to turning off the actual motor sound.

Turning to FIG. 6C and FIG. 6D, the process of FIG. 6C is executed in order to play a unique sound recording that is generated while the vehicle is traveling backwards or in reverse, while at the same time continuing to play the idle sound recording. In step 1, the programmed microcontroller 30 selects a reverse sound clip from the digital sound recording database 40, illustrated in FIG. 5. B, and at step 2, plays or replays the reverse sound clip and the idle sound clip. Then, at the end of the next time interval of interval clock 45, the microcontroller determines if the voltage being produced by gyroscope 50 is greater than one-half the power supply voltage. If the voltage is not greater, meaning that the vehicle is still traveling in reverse, control returns to step 2 where the reverse sound and idle sound clips are replayed. This process continues until, it is determined at step 3 that the voltage of the gyroscope is greater than one-half the power supply voltage, meaning that the vehicle is no longer moving in a backward direction, and control passes to step 4 where control is in turn sent to step 2 of FIG. 6B if the gyroscope voltage is equal to one-half the power supply voltage, indicating that the vehicle is idling; or to step 4 of FIG. 6B if the voltage is greater than one-half power supply voltage, meaning that the vehicle is moving in a forward direction.

FIG. 6D illustrates the process involved in determining if the sound clip of the vehicle moving in a forward direction should be turned off and, in turn, if the microcontroller should be turned off. This process is implemented in order to preserve battery power after the vehicle has stopped moving for a certain period of time and the Faraday generators have stopped recharging the batteries. Initially, at step 1, the microcontroller replays the idle sound clip at the end of the first time interval identified in step 3 of FIG. 6B. At step 2, a counter is set to equal 0. Then at step 3, the microcontroller determines at the end of the next time interval of interval clock 45 whether another voltage produced by gyroscope 50 is greater than, less than or equal to one-half the power supply voltage. If the voltage is greater than one-half power supply voltage, indicating that the vehicle is now moving forward, control returns at step 12 to step 4 in FIG. 5B, where the process described above of selecting a sound clip for forward motion from database 40 and playing it back is executed. But, if the voltage is less than one-half power supply voltage, meaning that the vehicle is traveling in reverse, control returns at step 13 to step 1 of FIG. 6C, where a reverse sound clip is selected from the database and played back, along with the idle sound clip, as also described above. On the other hand, is the voltage at step 3 of FIG. 6D is equal to one-half the power supply voltage, control passes to step 4 where the idle sound clip is replayed. At step 5, the counter is incremented by 1. Control then passes to step 6 where the microcontroller determines if the counter equals a first time limit, for example 2 seconds. This limit would be reached if the counter was equal to 4, because it has been assumed that the interval clock is measuring one-half second intervals that correspond to the one-half second sound clips. If this condition is not satisfied, control returns to step 3 where the cycle repeats until at step 6 the condition is satisfied. Once the condition is satisfied, control passes to step 7 where the microcontroller turns off the idle sound clip by closing audio gate 30D. At step 8, the counter is again incremented by 1. And at step 9, the microcontroller again determines, at the end of the next time interval, if the voltage produced by the gyroscope is greater than, less than or equal to one-half the power supply voltage. If it is greater, at step 14 control returns to step 4 in FIG. 6B; if it is less, at step 13 control returns to step 1 of FIG. 6C. Otherwise, control passes to step 10 where the microcontroller determines if the counter equals a second time limit, for example 15 seconds. If not, control returns to step 9 where the process is repeated until the condition at step 10. Then at step 11, the microcontroller turns itself off by closing oscillator gate 30E.

Figure 7:
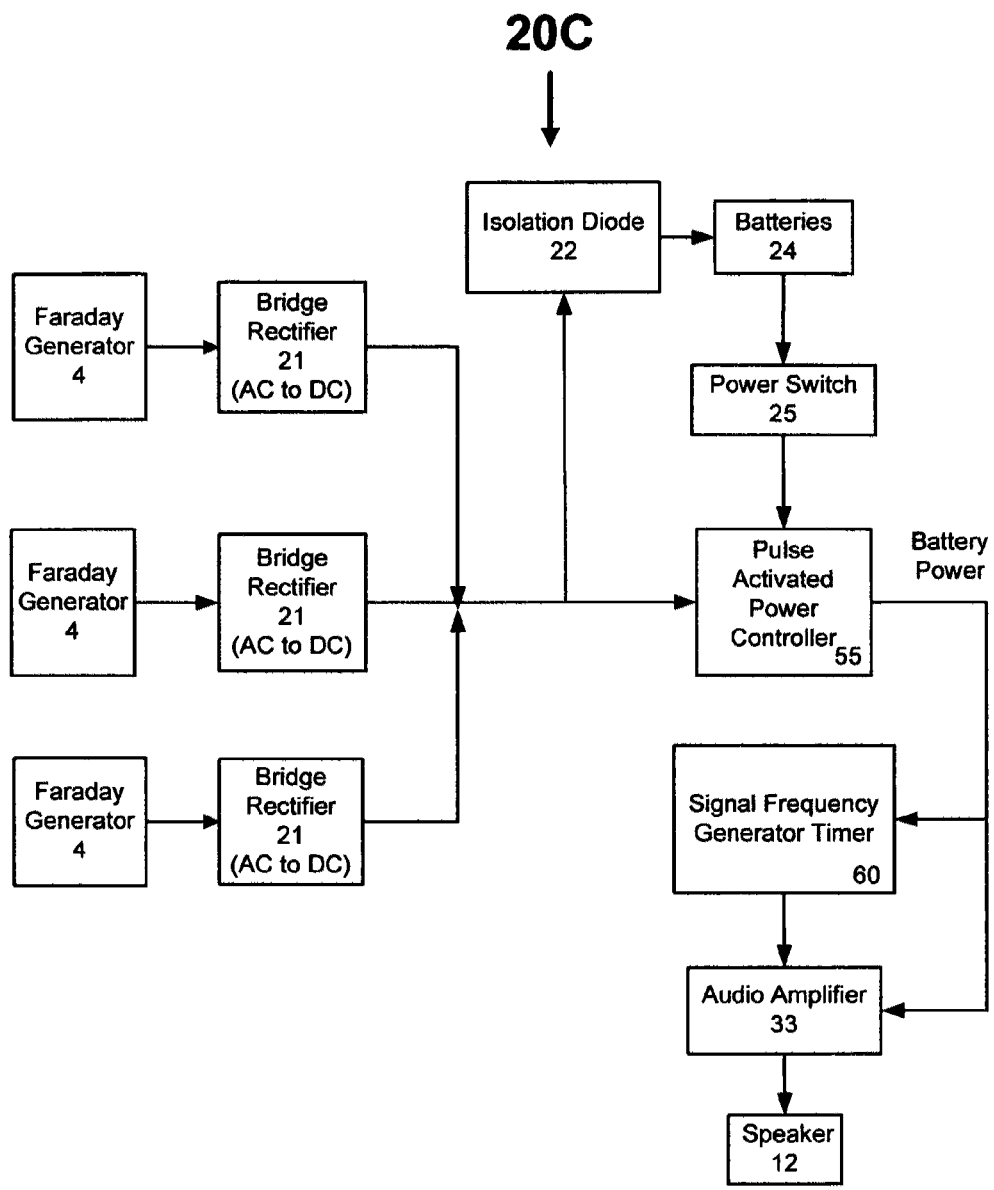
FIG. 7 is a schematic diagram of another embodiment of the electric components and circuitry that is used to generate a simulated motor sound for an electric vehicle.

In yet another embodiment of sound generation apparatus 1, the microcontroller can be omitted, and a simulated motor sound can be produced from battery power that is supplied directly to a signal frequency generator timer, and the simulated motor sound is generated in the same manner as that described for the generation of the buzzing sound in connection with FIGS. 4 and 4B. In this embodiment, however, it is not possible to determine the direction of motion of the vehicle, nor can the frequency of the sound be modified based upon the speed of the vehicle. As a result, only a single simulated motor sound can be generated: either a sound for a vehicle traveling in a forward direction or in reverse. Further, the simulated sound cannot be modified in order to create the tonal quality corresponding to an increase or decrease in the speed of the vehicle. The schematic diagram of FIG. 7 illustrates this embodiment.

Figure 7A:
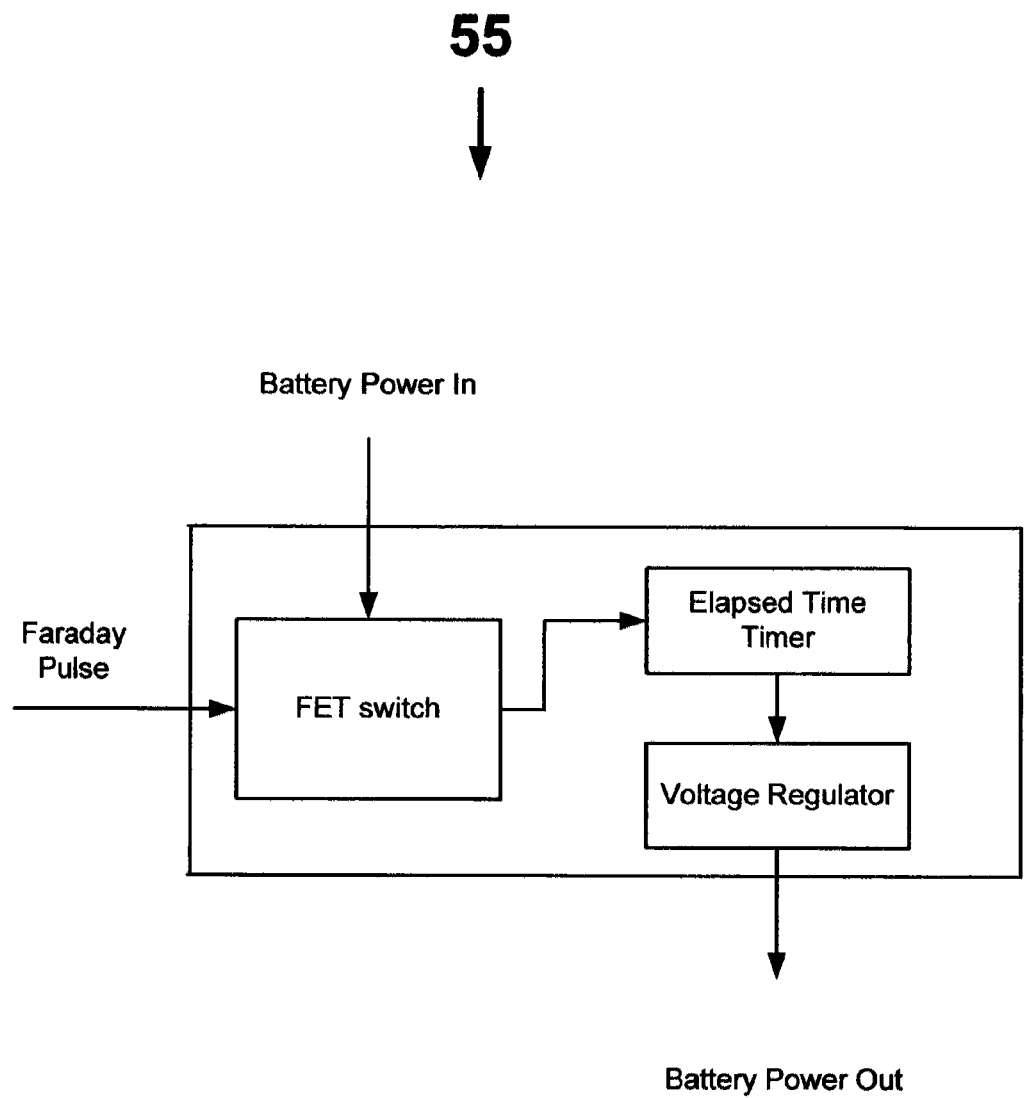
FIG. 7A is a flow chart illustrating the production of a simulated motor sound using the circuit illustrated in FIG. 7.

The diagram illustrates a sound generation circuit 20C having three faraday generators 4, with each generator connected to bridge rectifier 21 that converts the pulses of alternating current from the Faraday generators to pulses of direct current, again referred to herein as the "Faraday pulses". Each Faraday pulse of direct current is then supplied in parallel to isolation diode 22 and to pulse activated power controller 55. Isolation diode 22 passes the Faraday pulses to batteries 24 in order charge the batteries and at the same time isolates the Faraday pulses of direct current supplied to power controller from the direct current of the batteries. Power controller 55, as illustrated in more detail in FIG. 7A, comprises an FET switch, Timer and a Voltage Regulator. Faraday pulses are used to activate the FET switch and battery power is then used to maintain the active state of the switch. The FET switch is, in turn, used to modify the shape of the incoming Faraday pulses so that when the pulses are passed to the Timer the pulses activate the Timer and cause it to remain on until the Faraday generators stop generating Faraday pulses. Once the Timer is activated, battery power is passed through power switch 25, which is manually activated prior to using this embodiment of apparatus 1, and then to power controller 55. The activated Timer within power controller 55 then passes the battery power to the Voltage Regulator, which prevents any unwanted spikes in battery power being passed to signal frequency generator timer 60. Once battery power is supplied to signal frequency generator timer 60, the simulated motor sound, preferably as a buzzing sound, is generated in the same manner as that described in connection with FIGS. 4 and 4B.

Although the sound generation apparatus and method for an electric vehicle has been described in its preferred embodiment and in certain other embodiments, it will be recognized by those skilled in the art that other embodiments and features may be provided without departing from the underlying principals of those embodiments. The scope of the invention is defined by the appended claims.

The invention claimed is:

1. A sound generation apparatus for an electric vehicle that is being operated by a driver, the apparatus comprising:
   a sound generation circuit that is attached to a wheel of the electric vehicle;
   at least two radially positioned Faraday generators within the circuit for supplying pulses of electrical current to the circuit while the wheels of the vehicle are rotating;
   at least one battery within the circuit for supplying battery power to the circuit;
   a pulse activated power controller within the circuit that is activated upon the receipt of an initial pulse form one of the at least two Faraday generators, said power controller for controlling the supply of battery power to the circuit; and
   a programmed microcontroller within the circuit for generating a motor sound for the electric vehicle while being operated by the driver, said microcontroller also having at least two microcontroller ports for receiving additional pulses produced by the at least two Faraday generators for determining whether the vehicle is accelerating, decelerating or moving in reverse and based upon its state of motion modifying the motor sound.

2. The sound generation apparatus of claim 1 in which the at least two Faraday generators is three Faraday generators and the at least two microcontroller ports is three microcontroller ports.

3. The sound generation apparatus of claim 1 in which the microcontroller uses a signal frequency generator timer that receives battery power from the power controller for use in the generation of a simulated motor sound.

4. The sound generation apparatus of claim 1 in which the microcontroller uses a sound recordings database containing a plurality of sound recording clips of the sounds of a combustion engine operating at various engine speeds for use in the generation of an actual motor sound for the electric vehicle.

5. A sound generation apparatus for an electric vehicle that is being operated by a driver, the apparatus comprising:
- a sound generation circuit that is attached to a wheel of the electric vehicle;
- at least two radially positioned Faraday generators within the circuit for supplying pulses of electrical current to the circuit while the wheels of the vehicle are rotating;
- at least one battery within the circuit for supplying battery power to the circuit;
- a pulse activated power controller within the circuit that is activated upon the receipt of an initial pulse form one of the at least two Faraday generators, said power controller for controlling the supply of battery power to the circuit;
- a gyroscope within the circuit for generating voltage values based upon the angular velocity of the wheel of the vehicle; and
- a programmed microcontroller within the circuit having a sound recordings database containing a plurality of sound recording clips of the sounds of a combustion engine operating at various engine speeds for use by the microcontroller in the generation of an actual motor sound for the electric vehicle; said microcontroller using the voltage values generated by the gyroscope to periodically calculate the angular velocity of the wheel, selecting an angular velocity based upon engine speed from the database that most closely matches the angular velocity of the wheel, and playing the sound clip that is associated with the engine speed.

6. A sound generation apparatus for an electric vehicle that is being operated by a driver, the apparatus comprising:
- a sound generation circuit that is attached to a wheel of the electric vehicle;
- at least two radially positioned Faraday generators within the circuit for supplying pulses of electrical current to the circuit while the wheels of the vehicle are rotating;
- at least one battery within the circuit for supplying battery power to the circuit;
- a pulse activated power controller within the circuit that is activated upon the receipt of an initial pulse form one of the at least two Faraday generators, said power controller for controlling the supply of battery power to the circuit; and
- a signal frequency generator timer that receives battery power from the power controller for use in the generation of a simulated motor sound for the electric vehicle.

7. A method of generating a sound for an electric vehicle that is being operated by a driver, comprising:
- generating an initial pulse of electrical current from one of at least two rotating Faraday generators within a sound generation circuit attached to the wheel of the vehicle;
- activating a pulse activated power controller within the circuit by using the initial pulse of electrical current;
- supplying battery power through the power controller to a microcontroller within the circuit;
- generating a simulated motor sound from the battery power supplied to the microcontroller;
- sending additional pulses of electrical current from the at least two rotating Faraday generators to at least two microcontroller ports; and
- processing the additional pulses to determine whether the vehicle is accelerating, decelerating or moving in reverse and based upon its state of motion modifying the simulated motor sound.

* * * * *